(12) United States Patent
Tsukamoto

(10) Patent No.: US 7,306,481 B2
(45) Date of Patent: Dec. 11, 2007

(54) WIRING HARNESS EXCESS LENGTH ABSORBING DEVICE

(75) Inventor: Masashi Tsukamoto, Kosai (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/472,276

(22) Filed: Jun. 22, 2006

(65) Prior Publication Data
US 2006/0292923 A1    Dec. 28, 2006

(30) Foreign Application Priority Data
Jun. 24, 2005  (JP) ............................ P2005-185353
Jan. 18, 2006  (JP) ............................ P2006-009656

(51) Int. Cl.
*H01R 13/72* (2006.01)

(52) U.S. Cl. ......................... 439/501; 174/69; 174/135; 174/72 A

(58) Field of Classification Search ................ 439/501; 174/69, 135, 72 A
See application file for complete search history.

(56) References Cited

U.S. PATENT DOCUMENTS

| | | | | |
|---|---|---|---|---|
| 5,468,159 | A * | 11/1995 | Brodsky et al. | ............ 439/501 |
| 6,818,827 | B2 * | 11/2004 | Kato et al. | ................ 174/72 A |
| 7,075,011 | B1 * | 7/2006 | Kogure et al. | ............ 174/72 A |
| 2003/0037958 | A1 * | 2/2003 | Watanabe et al. | ........... 174/135 |
| 2006/0134970 | A1 * | 6/2006 | Watanabe et al. | ........... 439/501 |

FOREIGN PATENT DOCUMENTS

| | | |
|---|---|---|
| DE | 38 43 665 A1 | 7/1989 |
| DE | 101 18 205 A1 | 10/2001 |
| DE | 101 31 950 A1 | 1/2002 |
| JP | 10-071855 A | 3/1998 |
| JP | 10-181473 A | 7/1998 |
| JP | 10-181476 A | 7/1998 |
| JP | 2001-354085 A | 12/2001 |
| JP | 2005-020895 A | 1/2005 |
| JP | 2005-137082 A | 5/2005 |

OTHER PUBLICATIONS

Extended European Search Report dated Nov. 2, 2006.

* cited by examiner

*Primary Examiner*—Gary Paumen
(74) *Attorney, Agent, or Firm*—Sughrue Mion, PLLC

(57) ABSTRACT

A wiring harness excess length absorbing device includes a supporting portion that rotatably supports a straight part of a wire harness, and a pullout portion through which a pass-through portion of the wire harness is passed. The supporting portion and the pull out portion define a form of the wire harness in which an incompletely annular curved portion of the wire harness is formed, one end of the curved portion continues to the straight portion, the straight portion continues to a stationary side wiring harness portion, the other end of the curved portion continues to the pass-through portion which is continued to a movable side wiring harness portion, and a plane defined by the curved portion is perpendicular to an extending direction of the straight portion. When the movable side wiring harness portion is moved, the straight portion twists in a circumferential direction thereof while a diameter of the curved portion is expanded or contracted.

15 Claims, 14 Drawing Sheets

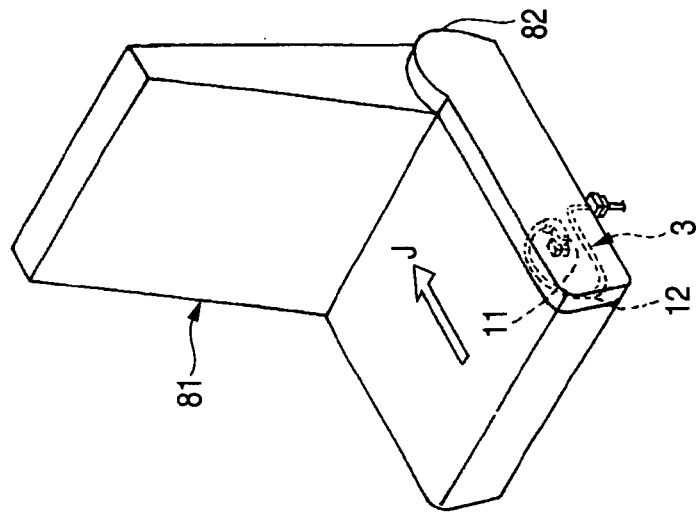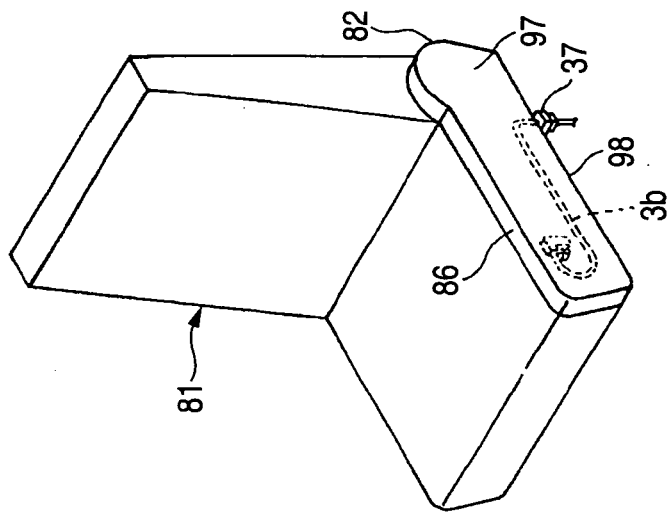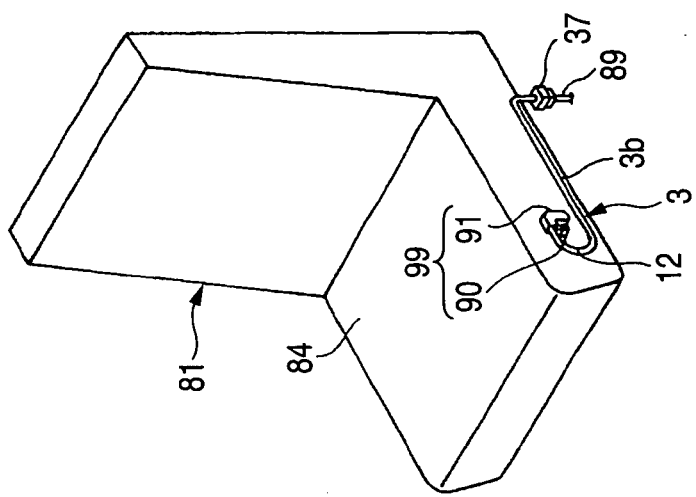

WIRING HARNESS EXCESS LENGTH ABSORBING DEVICE

BACKGROUND OF THE INVENTION

The present invention relates to a normally feeding wiring harness excess length absorbing device which absorbs an excess length of a wiring harness by curving the wiring harness into a substantially semi-annular shape and expanding and contracting a curved portion resulting from the curving of the wiring harness.

FIGS. 20 to 21 show one form of a conventional wiring harness excess length absorbing device (JP-A-10-181473 (FIGS. 6 to 8)).

This wiring harness excess length absorbing device 71 is such that a wiring harness 73 is curved into a loop within a case 72 in such a manner as to exit from one opening 74 and the other opening 75 of openings formed in the case 72 and that a loop portion 73a of the wiring harness 73 is biased by a leaf spring 76 in a direction in which it expands diametrically.

As shown in FIGS. 22A to 22B, this wiring harness excess length absorbing device 71 is mounted on a front side door 77 of an automobile such that when the door 77 is closed as shown in FIG. 22A, the wiring harness 73 expands diametrically within the case as shown in FIG. 20, whereas when the door 77 is opened as shown in FIG. 22B, the wiring harness 71 is pulled out of the case 72 and the loop portion 73a contracts diametrically as shown in FIG. 21. The wiring harness 73 connects to a power supply side at one end and an auxiliary device within the door at the other end thereof. In the figures mentioned above, reference numeral 78 denotes a locking clip for fixing the wiring harness 73 to a vehicle body 79.

This wiring harness excess length absorbing device 71 is designed to be mounted on not only the door 77 but also the vehicle body 79. In addition, in place of the leaf spring 76, a coil spring may be mounted on the wiring harness 73 within the case so as to pull the wiring harness 73 into the case by means of biasing force of the coil spring (refer to JP-A-10-181476 (FIG. 5)).

As a wiring harness excess length absorbing device other than those described above, for example, JP-A-2001-354085 (FIG. 4) proposes a wiring harness excess length absorbing device for an automotive sliding door (not shown). In this wiring harness excess length absorbing device, a wiring harness is accommodated in a case in such a manner as to be bent into a substantially semi-circular shape by virtue of biasing by a leaf spring, and one end of the wiring harness is made to exit towards a sliding door side auxiliary device from a front opening in the case, whereas the other end of the wiring harness is made to exit towards a vehicle body from a lower opening in the case in such a manner as to swing freely.

When the sliding door is closed, the wiring harness is pulled out to the rear while supported at a vehicle body side fixing portion, whereas as the sliding door is being opened, an excess length of the wiring harness is absorbed by the leaf spring, and when the sliding door is opened, the wiring harness is pulled out to the front while supported at the fixing portion.

In the conventional wiring harness excess length absorbing device 71 shown in FIG. 20, however, since the wiring harness 73 intersects itself within the case, there is caused a problem that portions of the wiring harness 73 which intersect each other tend to rub against each other, whereby the wearing down of the relevant portion is facilitated. In addition, since the wiring harness 73 is expanded and contracted in the loop, when attempting to set its extending and contracting stroke large, the wiring harness 73 is contracted to a small diameter and a large bending load is applied to the wiring harness 73, and this works to reduce durability and enlarge the case, causing a problem that the extending and contracting stroke (excess length absorption length) is difficult to be set. In addition, since the wiring harness 73 is pulled into the case direct by the spring member 76, the large spring member 76 is necessary, and this works to enlarge the mechanism and imposes a limitation on the configuration of the spring member 76. Additionally, since the metallic spring member 76 is brought into direct contact with the wiring harness 76, there is caused a problem that the insulation sheathing of the wiring harness 73 becomes easy to wear. In addition, the spring member 76 causes other problems that the number of components is increased, the mechanism is enlarged, an additional man-hour is necessary to separate the resin case 72 from the metallic spring member 76 when disassembling the mechanism for recycling, and when a coil spring is used as the spring member, the wiring harness 73 has to be passed through the coil spring, deteriorating the assembling properties of the mechanism.

SUMMARY OF THE INVENTION

The invention was made in view of the situations, and an object thereof is to provide a wiring harness excess length absorbing device which can increase the excess length absorption length without wear due to rubbing resulting from the intersection of the wiring harness and forced load applied to the wiring harness when it contracts diametrically while making compact the construction of the construction thereof. In addition to this, the other object of the invention is to provide a wiring harness excess length absorbing device which can extend and contract the wiring harness in an ensured fashion and quickly without wear or the like generated by the contact of the wiring harness biasing spring member with the wiring harness and limitation imposed on the size and configuration of the spring member.

With a view to accomplishing the objects, according to a first aspect of the invention, there is provided a wiring harness excess length absorbing device, comprising:

a supporting portion that rotatably supports a straight part of a wire harness; and a pullout portion through which a pass-through portion of the wire harness is passed, wherein the supporting portion and the pull out portion define a form of the wire harness in which an incompletely annular curved portion of the wire harness is formed, one end of the curved portion continues to the straight portion, the straight portion continues to a stationary side wiring harness portion, the other end of the curved portion continues to the pass-through portion which is continued to a movable side wiring harness portion, and a plane defined by the curved portion is perpendicular to an extending direction of the straight portion; and wherein when the movable side wiring harness portion is moved, the straight portion twists in a circumferential direction thereof while a diameter of the curved portion is expanded or contracted.

According to the configuration described above, when, for example, the movable side wiring harness portion of the wiring harness is pulled out of a wiring harness accommodating portion, the curved portion contracts diametrically while supported at the straight portion somehow in a swinging fashion and the straight portion twists to absorb the swing of the curved portion in the wiring harness accommodating portion. Then, when the pulling out of the wiring harness is released, the wiring harness is pulled into the accommodating portion by virtue of elastic force resulting from its own rigidity, for example, and expands diametrically into an incompletely annular shape while supported at the straight portion and the straight portion twists reversely to be restored to its initial shape. The wiring harness accommodating portion can be constructed by the case and a vehicle panel but is not an essential constituent member.

According to a second aspect of the invention, there is provided a wiring harness excess length absorbing device as set forth in the first aspect of the invention including a rotary clamp that supports the one end of the curved portion and the straight portion.

By adopting the configuration described above, an intersecting portion between the curved portion and the straight portion of the wiring harness (a portion including a proximal end side portion of the curved portion and a distal end side portion of the straight portion) is supported by the clamp at a portion on the mounting side in such a manner as to rotate in the circumferential direction of the straight portion. As the portion on the mounting side, a door, a sliding seat and the like of a vehicle are raised. The rotary clamp is such as to be made up of, for example, an outer clamp fixed to the mounting side and an inner clamp which is supported on an inside of the outer clamp in such a manner as to rotate freely in the circumferential direction in such a state that it supports the wiring harness.

According to a third aspect of the invention, there is provided a wiring harness excess length absorbing device as set forth in the first or second aspect of the invention, including a biasing member that biases the curved portion in a direction in which the diameter of the curved portion is expanded.

By adopting the configuration described above, when the pulling out force of the wiring harness is released, the spring member expands diametrically the curved portion of the wiring harness, for example, in the wiring harness accommodating portion so as to pull the wiring harness into the interior of the accommodating portion. The wiring harness may be such as to have a weak rigidity (such as to have good bending properties).

According to a fourth aspect of the invention, there is provided a wiring harness excess length absorbing device as set forth in the third aspect of the invention, wherein the biasing member is an elastic member or a spiral spring.

By adopting the configuration described above, the curved portion of the wiring harness is biased along the full circumference thereof with a uniform force in a direction in which the curved portion expands diametrically, so that, for example, the withdrawal of the wiring harness into the wiring harness accommodating portion is effected in an endured fashion and quickly.

According to a fifth aspect of the invention, there is provided a wiring harness excess length absorbing device, comprising:

a guide member that is rotatably supported at a proximal end side of the guide member, and guides a wire harness which is arranged along the guide member so that the wire harness is defined that one end of the wiring harness continues to a stationary side wiring harness portion at the proximal end side of the guide member, and the other end of the wiring harness continues to a movable side wiring harness portion by way of a distal end side of the guide member; and a biasing member that biases the guide member so as to pull the movable side wiring harness portion.

By adopting the configuration described above, for example, the wiring harness guide member is biased inwards by the biasing member in a direction in which the wiring harness is pulled in, and the wiring harness rotates together with the wiring harness guide member, for example, so as to be pulled into the accommodating portion from an opening formed in the case on a movable side of the wiring harness to thereby absorb an excess length thereof. In addition, when a force is applied to the wiring harness in a direction in which the wiring harness is pulled out, the wiring harness rotates in a reverse direction together with the wiring harness guide member, for example, so as to pulled out from the opening formed in the case on the movable side of the wiring harness.

According to a sixth aspect of the invention, there is provided a wiring harness excess length absorbing device as set forth in the fifth aspect of the invention, wherein the guide member has a curved portion at the distal end side of the guide member.

By adopting the configuration described above, the wiring harness is bent into a curved shape along the head portion with a large radius so as to prevent the generation of a bending with a small radius. The head portion acts as a wiring harness bending control portion. For example, when the wiring harness guide member rotates into the wiring harness accommodating portion (when the excess length is absorbed), the wiring harness is bent back smoothly from the head portion with a large bending radium, so that it bends with the large radius within the wiring harness accommodating portion.

According to a seventh aspect of the invention, there is provided a wiring harness excess length absorbing device as set forth in the fifth or sixth aspect of the invention including a supporting portion that rotatably supports a straight part of the wire harness. The wiring harness has an incompletely annular curved portion, and the one end of the curved portion continues to the straight portion, the straight portion continues to a stationary side wiring harness portion, and a plane defined by the curved portion is perpendicular to an extending direction of the straight portion.

By adopting the configuration described above, when the wiring harness is, for example, pulled out of the wiring harness accommodating portion, the curved portion of the wiring harness swings together with the wiring harness guide member while supported at the straight portion within the wiring harness accommodating portion to thereby be pulled out and the straight portion twists circumferentially so as to absorb the swing of the wiring harness. In addition, when the wiring harness is, for example, pulled into the wiring harness accommodating portion together with the wiring harness guide member, the straight portion twists in the reverse direction, whereby the twist is cancelled.

According to an eighth aspect of the invention, there is provided a wiring harness excess length absorbing device as set forth in any of the fifth to seventh aspects of the invention, wherein a groove for arranging the wire harness therein is formed in the guide member.

By adopting the configuration described above, since the wiring harness is, for example, stably positioned and supported within the wiring harness laying-out groove on the wiring harness guide member within the wiring harness accommodating portion, the pulling out and pulling out (the absorption of excess length) of the wiring harness is effected in an ensured fashion.

According to a ninth aspect of the invention, there is provided a wiring harness excess length absorbing device as set forth in the eighth aspect of the invention including a wiring harness accommodating portion that contains the wire harness. The groove is closed by an inner wall surface of the wiring harness accommodating portion.

By adopting the configuration described above, the wiring harness is surrounded by an inner surface of the wiring harness laying-out groove and the inner wall surface of the wiring harness accommodating portion so as to be held stably without a risk that it is dislodged from the groove, and moreover, the wiring harness is protected safely within the wiring harness laying-out groove without a risk that it rubs against the inner surface f the wiring harness accommodating portion.

According to a tenth aspect of the invention, there is provided a wiring harness excess length absorbing device as set forth in any of the fifth to ninth aspects of the invention, wherein the biasing member is a twisting coil spring.

By adopting the configuration described above, the twisting coil spring is, for example, provided elastically on the rotatably supported side (the proximal end side) of he wiring harness, and the twisting coil spring is brought into elastic contact with the wiring harness guide member at one end and the inner surface of the wiring harness accommodating portion at the other end thereof. The twisting coil spring can be disposed within a notched space in the inside of the wiring harness guide member.

According to an eleventh aspect of the invention, there is provided a wiring harness excess length absorbing device as set forth in any of the fifth to ninth aspects of the invention, including a wiring harness accommodating portion that contains the wire harness. The biasing member has an inclined portion which is provided in the form of an arc-shaped belt on an inner wall surface of the wiring harness accommodating portion. The inclined portion has a thickness which is gradually reduced as it extends inwards from an outer side of the wiring harness accommodating portion.

By adopting the configuration described above, the inclined portion of the wiring harness accommodating portion is brought into elastic press contact with the wiring harness guide member when the wiring harness is pulled in (when the excess length is absorbed), so as to cause the wiring harness guide member to rotate in the direction in which the wiring harness is pulled into the accommodating portion. The inclined portion imparts elastic force by means of, for example, the elasticity of a wall portion of the wiring harness accommodating portion. The wiring harness is pulled out against the biasing by the inclined portion. The wiring harness guide member slides smoothly on the inclined portion which is formed into the narrow arc-shaped belt with low friction.

According to a twelfth aspect of the invention, there is provided a wiring harness excess length absorbing device as set forth in the eleventh aspect of the invention, wherein the inclined portion is separated from the inner wall surface by a slit.

By adopting the configuration described above, the inclined portion is separated from the wiring harness accommodating portion by the slit so as to constitute a leaf spring which is supported at one or both ends. The elastic force is increased by the leaf spring-like inclined portion.

According to a thirteenth aspect of the invention, there is provided a wiring harness excess length absorbing device as set forth in any of the fifth to ninth aspects of the invention including a wiring harness accommodating portion that contains the wire harness. The biasing member has a spiral inclined surface which is provided at the proximal end side of the guide member, and a projecting portion which is provided in the wiring harness accommodating portion so as to be brought into elastically contact with the inclined surface.

By adopting the configuration described above, when the projecting portion elastically presses against the spiral inclined surface, the wiring harness guide portion rotates in a spiral direction of the inclined surface, and the wiring harness is pulled into the wiring harness accommodating portion, whereby the excess length of the wiring harness is absorbed. The projecting portion is preferably formed integrally on the leaf spring which is integrated with the wiring harness accommodating portion. The spiral inclined portion is preferably disposed about a rotatably supported portion of the wiring harness guide portion.

According to the first aspect of the invention, for example, since the wiring harness does not intersect itself within the wiring harness accommodating portion, the wiring harness is prevented from rubbing against itself, and the normally feeding reliability is increased. In addition, a space within the wiring harness accommodating portion is effectively used (the dead space therein is reduced) through the combination of the expanding and contracting operation of the curved portion and the twisting operation of the straight portion of the wiring harness, the wiring harness accommodating portion can be made compact, and a large extending and contracting stroke is obtained, whereby the excess length absorption length is increased.

According to the second aspect of the invention, since the intersecting portion between the curved portion and the straight portion of the wiring harness is stably supported on the mounting side by the clamp, the expanding and contracting operation of the curved portion and the twisting operation of the straight portion are performed smoothly and in an ensured fashion.

According to the third aspect of the invention, the wiring harness can be pulled into the wiring harness accommodating portion by means of the biasing member in an ensured fashion, and therefore, the excess length of the wiring harness can be absorbed in an ensured fashion. In addition, the wiring harness is allowed to be made up of a material having low rigidity and good bending properties, thereby making it possible to increase the pulling out and pulling properties thereof.

According to the fourth aspect of the invention, the curved portion of the wiring harness can be biased uniformly by the spiral spring so as to ensure the completion of absorption of the excess length of the wiring harness. In addition, for example, since the curved portion is expanded diametrically with the large radium within the wiring harness accommodating portion, the space within the wiring harness accommodating portion is effectively used, thereby making it possible to make compact the wiring harness accommodating portion.

According to the fifth aspect of the invention, the wiring harness can be pulled in quickly together with the wiring harness guide member, whereby the not only the excess length absorbing properties are increased but also the wiring harness can be rotated together with the wiring harness guide member so as to be pulled out quickly and without friction and rubbing, so that the damage to the wiring harness is prevented. In addition, since various types of spring members and biasing mechanisms can be properly used as the biasing member for the wiring harness guide member, the enlargement of the space within the wiring harness accommodating portion by the conventional spring member is prevented, thereby making it possible to obtain the compact wiring harness excess absorbing mechanism. In addition, since the biasing member is not brought into direct contact with the wiring harness in any case by supporting the wiring harness by the wiring harness guide member, there exists no concern about wear and damage to the wiring harness.

According to the sixth aspect of the invention, since the bending radius of the wiring harness is largely controlled by the head portion of the wiring harness guide member, the bending durability of the wiring harness is increased. In addition, since the wiring harness that is caused to exit from the head portion bends, for example, with the large radius in the wiring harness accommodating portion, the wiring harness excess absorption stroke is increased, and the dead space within the wiring harness accommodating portion is reduced, thereby making it possible to make compact the wiring harness accommodating portion.

According to the seventh aspect of the invention, the space within the wiring harness accommodating portion is effectively used (the dead space therein is reduced) through the combination of the expanding and contracting operation of the curved portion and the twisting operation of the straight portion of the wiring harness, whereby the wiring harness accommodating portion can be made compact, and a large extending and contracting stroke is obtained, thereby making it possible to increase the excess length absorption length.

According to the eighth aspect of the invention, for example, the wiring harness is stably positioned and supported in the wiring harness laying-out groove on the wiring harness guide member within the wiring harness accommodating portion, whereby the absorption of excess length can be performed smoothly and in an ensured fashion. In addition, the friction between the wiring harness and the inner surface of the wiring harness accommodating portion is reduced, whereby the pulling out and pulling in of the wiring harness can be effected with small force in a smoothed fashion without abnormal noise or the like.

According to the ninth aspect of the invention, since the wiring harness is held within the wiring harness laying-out groove without the risk of the wiring harness being dislodged from the groove, the wiring harness does not have to be fixed to the wiring harness guide member, and hence, an additional man-hour and an additional component such as a band or tape which would otherwise be required can be deleted, whereby not only the assembling workability of the wiring harness excess length absorbing device is increased but also the production costs are reduced. In addition, since the wiring harness is protected safely within the wiring harness laying-out groove, the normally feeding reliability is increased. Additionally, since the wiring harness can be easily removed from the wiring harness laying-out groove when disassembled for disposal, the maintenance servicing properties and disassembling properties of the mechanism are improved.

According to the tenth aspect of the invention, the conventional long leaf spring is not necessary, and the wiring harness guide member can be biased with the short twisting coil spring in an ensured fashion, whereby the wiring harness excess length absorbing device can be made compact in size by saving the space within the wiring harness accommodating portion.

According to the eleventh aspect of the invention, a separate spring member becomes unnecessary by, for example, molding the inclined portion, which functions as the biasing member, from resin in such a manner as to be integrated with the wall portion of the wiring harness accommodating portion, whereby the number of components and the production costs are reduced. In addition, since there exists no separate metallic spring member that has to be removed at the time of disassembling, the disassembling properties are improved.

According to the twelfth aspect of the invention, the wiring harness guide member is biased in the direction in which the wiring harness is pulled in by the leaf spring-like inclined portion in a more ensured fashion, so as to ensure the absorption of excess length.

According to the thirteenth aspect of the invention, the separate spring member becomes unnecessary by, for example, molding the biasing member from resin in such a manner as to be integrated with the wall portion of the wiring harness accommodating portion, whereby the number of components and the production costs are reduced. In addition, since there exists no separate metallic spring member that has to be removed at the time of disassembling, the disassembling properties are improved. Additionally, only a limited space is necessary for the biasing member, and therefore, the wiring harness excess length absorbing device can be made compact in size.

BRIEF DESCRIPTION OF THE DRAWINGS

The above objects and advantages of the present invention will become more apparent by describing in detail preferred exemplary embodiments thereof with reference to the accompanying drawings, wherein:

FIG. 19A is a perspective view showing a state where the wiring harness is assembled to a seat, FIG. 19B is a perspective view showing a state where a seat interior panel is assembled, and FIG. 19C is a perspective view showing a state where the seat is caused to slide;

FIGS. 22A to 22B shows examples of a mounting state of a conventional wiring harness excess length absorbing device, wherein FIG. 22A is a plan view resulting when an excess length is being absorbed, and FIG. 22B is a plan view resulting when a wiring harness is pulled out.

DETAILED DESCRIPTION OF THE PREFERRED EMBODIMENTS

Figure 1:
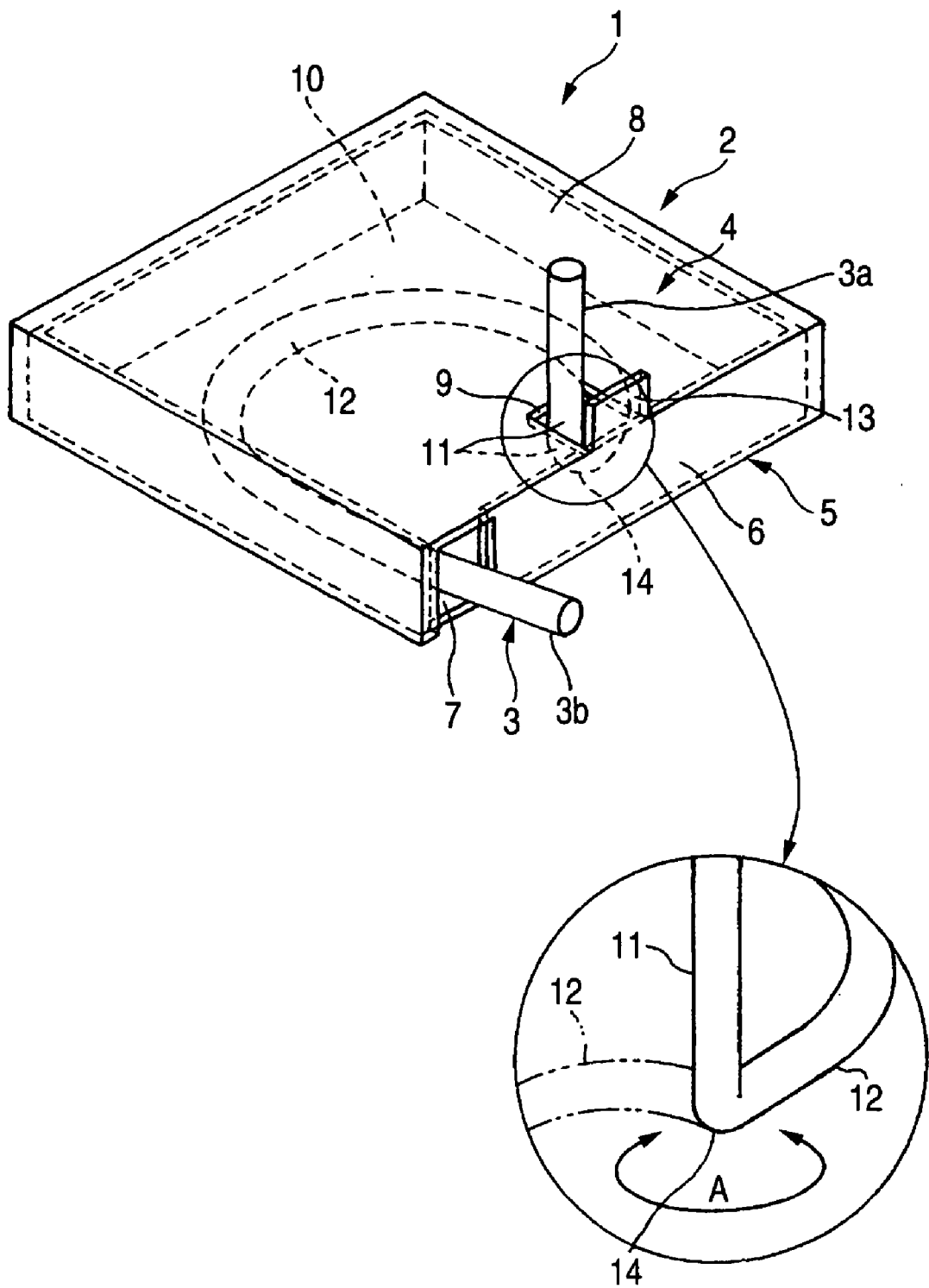
FIG. 1 is a perspective view showing a first embodiment of a wiring harness excess length absorbing device according to the invention (a circled portion is an enlarged view of a main part thereof)

FIG. 1 shows a first embodiment of a wiring harness excess length absorbing device according to the invention.

This wiring harness excess length absorbing device (apparatus) 1 is such as to include a rectangular box-shaped thin case (a wiring harness accommodating portion) 2 and a wiring harness 3 which is formed into a substantially semi-annular shape (an incompletely annular shape) for accommodation within the case.

The case 2 is made from a synthetic resin material and is made up of an upper cover 4 and a lower case main body 5. The case main body 5 is surrounded by front, rear, left and right wall portions and a lower wall portion to thereby have a wiring harness accommodating portion inside thereof. The cover 4 is made up of front, rear, left and right wall portions and an upper wall portion and is covered externally over the case main body 5 to thereby be locked on the case main body 5 by means of a locking member (not shown) made up of a combination of locking frame piece and engagement projections, locking projections and engagement holes or the like. Note that the cover 4 may be such as to be made up of only a plate-like upper wall.

An opening 7, which is one of openings from which the wiring harness is cause to exit, is provided at one end portion of a side wall 6 of the case 2, which is one of the wall portions thereof, and the other opening 9 is provided in an upper wall 8 of the case, which is one of the wall portions thereof, at a position adjacent to a center of the side wall 6. Note that in this specification, directions denoted as upper, lower, front, rear, left, and right are so described only for the purpose of description and hence, do not necessarily coincide with such directions resulting when the wiring harness excess length absorbing device (apparatus) 1 is actually mounted.

The wiring harness 3 that is introduced from the opening 7 bends into a substantially semi-annular shape along a horizontal bottom wall surface 10 within the case to reach direct below the other opening 9 (a curved portion formed then is denoted by reference numeral 12), bends upwards in a direction which intersects the bottom wall surface 10 at right angles (a curved portion formed then is denoted by reference numeral 14) right below the opening so as to rise perpendicularly from the bottom wall surface 10 towards the other opening 9 (a straight portion which is a rising portion formed then is denoted by reference numeral 11) and is eventually caused to exit to the outside from the opening 9. The "substantially semi-annular shape" of the wiring harness 3 in FIG. 1 means an incompletely annular shape which is a substantially circular shape which is close to an annular shape and in which the wiring harness does not exist at part of the circumference thereof or the wiring harness 3 does not intersect or overlap itself.

As shown in a circled portion in FIG. 1, the curved portion (the bent portion) 12 of the wiring harness 3 expands and contracts diametrically within the case in such a manner as to swing about the straight portion 11 as a center (an axis center) in directions indicated by the line A having arrows at both ends thereof. At the same time, the straight portion 11 performs a twisting action (a torsional rotating action). The straight portion 11 is fixed to a plate portion (a fixing portion) 13 which is provided on a side of the cover 4 which lies to the other opening 9 in such a manner as to project therefrom by being bound by a band or tape. The form of the fixing portion 13 is not limited to the plate shape but may be a hole portion or the like through which a band is passed to fasten the straight portion 11.

The wiring harness 3 contracts diametrically within the case when pulled out from the opening 7 (lying to a movable side of the wiring harness 3) and expands diametrically within the case when pushed in or pulled in from the opening 7 so as to absorb an excess length in the wiring harness. When pulled in, the wiring harness 3 is pulled in on its own by virtue of its own rigidity (spring properties). When pushed in, the wiring harness is forcibly pushed in by virtue of the movement of a movable element (not shown) in a direction in which the wiring harness is pushed in. As the movable element, a front side door, a tailgate, a sliding door, a sliding seat and the like of a vehicle.

When applied to a sliding seat, the wiring harness excess length absorbing device (apparatus) 1 is disposed thereon, for example, with the case 2 caused to erect perpendicularly, a stationary side wiring harness portion 3a is connected to an auxiliary device on the seat side while a movable side wiring harness portion 3b is connected to a floor side wiring harness via a connector. A side wall 6' of the case may be opened into a large slit-like shape, whereby the movable side wiring harness portion 3a is bent in a 90-degree direction so as to be connected to the floor side, so that the movable side wiring harness portion 3b is allowed to swing back and forth. This form of application will be described in detail in an embodiment which will be described later on.

In FIG. 1, the wiring harness 3 is made up by binding a plurality of electric wires each covered with an insulator are bound together with a tape or covering the same with a protection tube. Various types of tubes including resin corrugated and net tubes can be used as the protection tube. In particular, the wiring harness 3 made up of the electric wires which are bound together with a tape has high rigidity (spring properties) and can expand diametrically on its own by means of elastic force thereof.

According to the first embodiment that has been described heretofore, by extending and contracting the wiring harness 3 through the combination of the bending operation of the wiring harness 3 in the expanding and contracting directions within the case and the circumferential twisting operation of the straight portion 11 of the wiring harness 3 within the case, the long extending and contracting stroke (the excess length absorption amount) can be secured within the compact case 2. In addition, since the wiring harness does not intersect itself within the case, the wear due to the wiring harness 3 rubbing against itself does not caused, and hence, the normally feeding reliability is increased. The same advantages can also be provided in a second embodiment, which will be described below.

Note that while in the embodiment shown in FIG. 1, the rectangular box-shaped case is used, the shape of the case 2 may be formed into a substantially semi-circular shape or substantially fan-like shape so as to coincide with the shape of the substantially semi-annular curved portion of the wiring harness 3.

In addition, the case 2 may be deleted, and instead by providing a wiring harness accommodating recessed portion (the wiring harness accommodating portion) in a door inner panel or door trim of, for example, a sliding door or providing a wiring harness accommodating recessed portion (the wiring harness accommodating portion) in an interior panel of a sliding seat, an inner circumferential wall of each recessed portion can be used for a substitute for the case 2. This form of example will be described by reference to an embodiment shown in FIG. 16, which will be described below. In addition, the recessed portions may not have to be formed, and instead a space within the sliding door or a space within the sliding seat (the wiring harness accommodating portion) can be made use of so that the wiring harness 3 can be expanded and contracted (extended and contracted). The deletion of the case 2 like this can equally be effected in individual embodiments of the invention which will be described later on.

Figure 2:
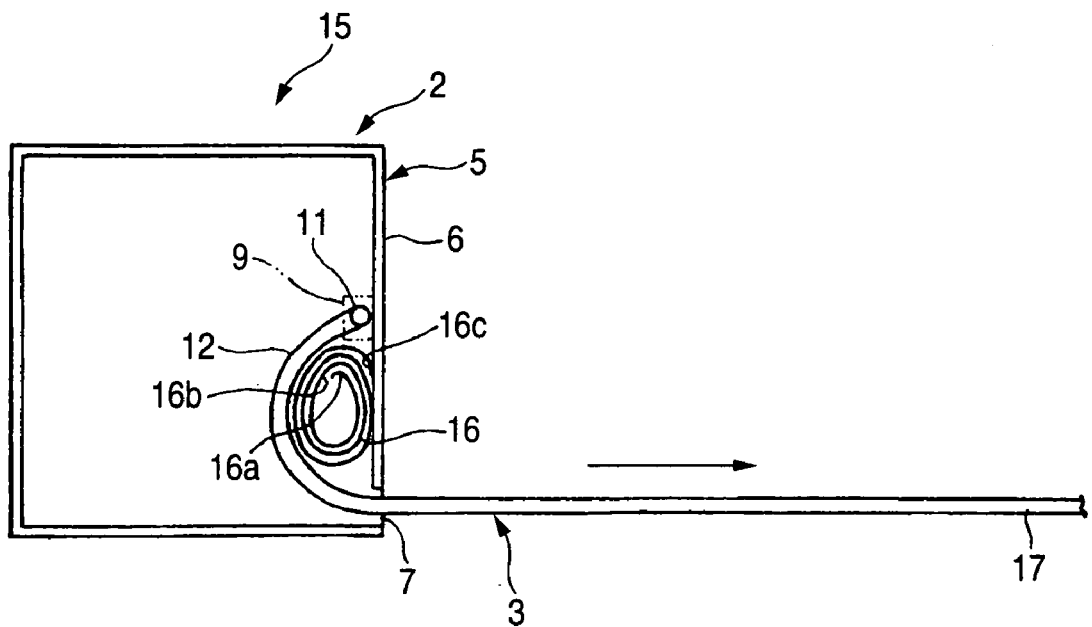
FIG. 2 is a plan view showing a second embodiment of a wiring harness excess length absorbing device.
Figure 3:
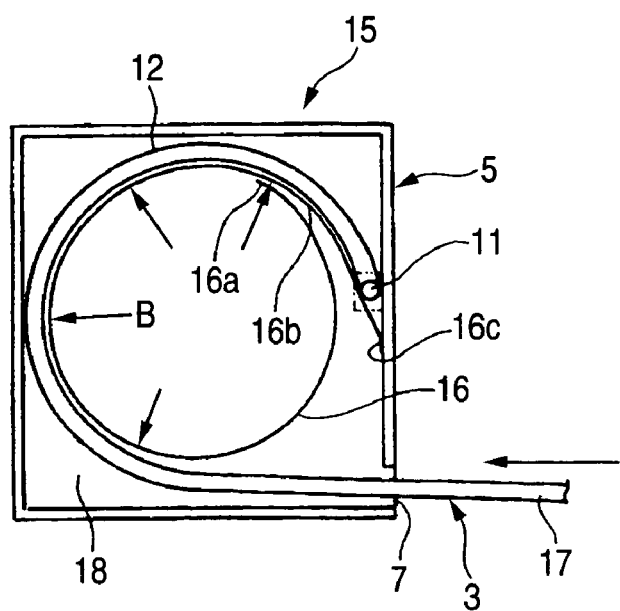
FIG. 3 is a plan view showing the same wiring harness excess length absorbing device resulting when an excess length is being absorbed.

FIGS. 2 to 3 show a second embodiment of a wiring harness excess length absorbing device (apparatus) according to the invention.

This wiring harness excess length absorbing device (apparatus) 15 is such that a power spiral spring (the spring member or the biasing member) is added to the wiring harness excess length absorbing device (apparatus) 1 shown in FIG. 1, and the other configurations are similar to those of the wiring harness excess length absorbing device (apparatus) 1 shown in FIG. 1. Like reference numerals are imparted to like constituent members to those shown in FIG. 1, and the description thereof will be omitted here. FIGS. 2 to 3 show a state resulting when looking down at a case 2 with its cover 4 (FIG. 1) removed.

The spiral spring 16 is such as to result by winding a metallic leaf spring into a spiral shape, and an outer end of the spiral spring 16 is fixed to the vicinity of a straight portion 11 of a wiring harness 3 within the case, whereas an inner end 16*a* of the spiral spring 16 is folded inwards as shown in FIG. 2 so as to constitute a free end which is adapted to be brought into smooth sliding contact with an inner surface of an external spring portion 16*b*. The outer end 16*c* is fixedly inserted into an inserting portion (not shown) on an inside of a side wall 6 of the case 2, for example.

The spiral spring 16 expands diametrically in a free state, so as to pull in the wiring harness 3 into the case as shown in FIG. 3 to thereby absorb an excess length in the wiring harness 3. An outward biasing force of the spiral spring 16 acts uniformly on a semi-annular (incompletely annular) curved portion 12 of the wiring harness 3 as indicated by arrows B, whereby the excess length in the wiring harness 3 is made to be effected in an ensured fashion and quickly. The free end 16*a* of the spiral spring 16 is brought into tangential contact with an inner surface of the spring portion which continues to the fixed end 16*c*, so that the diametric contracting operation of the spiral spring 16 shown in FIG. 2 can be performed smoothly.

When a movable element (not shown) such as a door is moved from the state shown in FIG. 3, the wiring harness 4 is pulled out in a straight line fashion as shown in FIG. 2 against the biasing by the spring, and the spiral spring 16 contracts diametrically together with the wiring harness 3 within the case. The curved portion 12 of he wiring harness 3 is contracted diametrically into a semi-circular shape to a movable side opening 7 while supported at a vertical straight portion 11.

For example, in a case where the wiring harness excess length absorbing device (apparatus) 15 is installed on a front side door or vehicle body of an automobile with a movable end 17 of the wiring harness 3 laid out on the vehicle body or front side door for normal feeding from the vehicle body side to the front side door side, FIG. 2 shows a state resulting when the front side door is opened, while FIG. 3 shows a state resulting when the front side door is closed (refer to the conventional example shown in FIG. 18).

In addition, in a case where the wiring harness excess length absorbing device (apparatus) 15 is installed on a sliding door or vehicle body of the automobile with the movable end 17 of the wiring harness 3 laid out on the vehicle body or sliding door for normal feeding from the vehicle body side to the sliding door side, although depending upon where the movable end (movable side wiring harness portion) 17 is positioned, FIG. 2 shows a state resulting when the sliding door is closed, while FIG. 3 shows a state resulting when the sliding door is opened. These are true with the embodiment shown in FIG. 1. The wiring harness excess length absorbing device (apparatus) 15 can needless to say be applied to a sliding seat. In these applications, as has been described with respect to the embodiment shown in FIG. 1, the case 2 can be deleted and substituted by a recessed portion or the like (the wiring harness accommodating portion) in the sliding door or sliding seat.

In addition, in the second embodiment, a curved leaf spring or the like (not shown) can be used in place of the spiral spring 16. When the leaf spring is used, a proximal end of the leaf spring is fixed to the same position as that where the distal end 16*c* of the spiral spring 16 is fixed, and in order that a free end of the leaf spring does not project to the outside, the free end is positioned at an angle of not more than 180° in an opposite direction from the proximal end 16*c* along the curved portion 12 of the wiring harness 3. A resin cap is preferably mounted on the free end of the leaf spring in increasing the sliding properties thereof with respect to the wiring harness 3 (in preventing the wear of the wiring harness 3). When the leaf spring is used, however, since the wiring harness 3 does not expand diametrically within the case as largely as shown in FIG. 3 but tends to extend straight direct to the opening 7 from the free end of the leaf spring, the wiring harness excess length absorption length is such as to be shorter than when the spiral spring 16 is used. In addition, the external end portion 16*c* of the spiral spring 16 is not fixed to the case 2 but is made to be a free end so that the spiral spring 16 is supported on the inner surface of the curved portion 12 of the wiring harness 3.

According to the second embodiment that has been described heretofore, as shown in FIG. 3, the wiring harness 3 can be expanded diametrically largely with the uniform force exerted by the spiral spring 16 so as to absorb the excess length in an ensured fashion and quickly. Since the spiral spring 16 expands diametrically so as to expand the semi-annular (incompletely annular) curved portion 12 of the wiring harness 3 until it reaches the inner surface of the case 2, a wiring harness accommodating space 18 within the case 2 can be used to a maximum extent to effect the pulling in of the wiring harness 3 or absorbing the excess length. In addition, as shown in FIG. 2, since the spiral spring 16 contacts diametrically small when the wiring harness is pulled out and the wiring harness 3 is supported by the spiral spring 16 so contracted so as to interrupt a further pulling out of the wiring harness 3, the spiral spring 16 does not waste the space within the case, thereby making it possible to make the case 2 compact in size.

Figure 4:
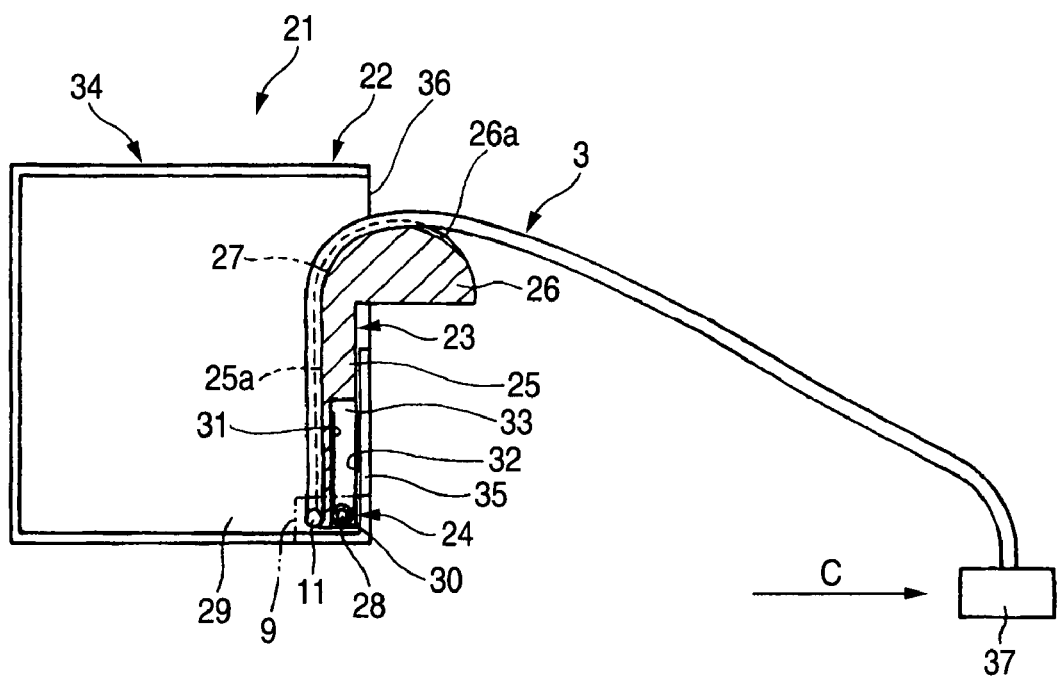
FIG. 4 is a plan view showing a third embodiment of a wiring harness excess length absorbing device.
Figure 5:
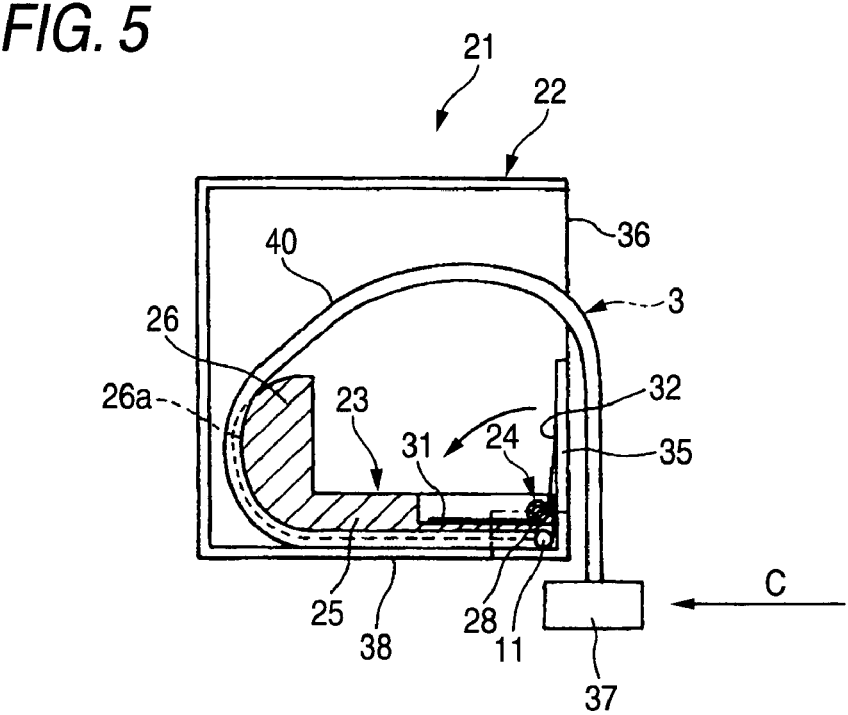
FIG. 5 is a plan view showing the same wiring harness excess length absorbing device resulting when an excess length is being absorbed.

FIGS. 4 to 5 are such as to show a third embodiment of a wiring harness excess length absorbing device (apparatus) according to the invention.

This wiring harness excess length absorbing device (apparatus) 21 is such that a guide arm (the wiring harness guide member) 23 is provided rotatably in a case (the wiring harness accommodating portion) 22, the guide are 23 is biased towards the inside of the case by a twisting coil spring (the spring member or biasing member) 24 and a wiring harness 3 is laid out along the guide arm 23.

The guide arm 23, as well as the case 22, is made from a synthetic resin material and is made up of a straight rod portion 25 and a semi-circular head portion 26 formed integrally at a distal end of the rod portion 25. The head portion 26 is disposed in such a manner as to be offset sideways relative to the distal end of the rod portion 25, and a side 25a of the rod portion 25 continues smoothly to an arc-shaped outer circumferential surface 26a of the head portion 26 in a tangential direction. A wiring harness laying-out groove 27 is formed on the guide arm 23 in such a manner as to extend from the side 25a of the rod 25 along the outer circumferential surface 26a of the head portion 26. The wiring harness laying-out groove 27 may be deleted, so that the wiring harness 3 can be supported by the sides 25a, 26a of the guide arm 23. The wiring harness laying-out groove 27 may be provided on not only the side of the guide arm 23 but also an upper side of the guide rail 23 as will be described in an embodiment shown in FIG. 9.

A proximal end portion of the guide arm 23 is rotatably supported on the case 22 in a corner portion of the case 22 via a shaft portion 28. The shaft portion 28 is provided on the guide arm 23 or a bottom wall 29 of the case 22 in such a manner as to be brought into rotatable engagement with a hole portion in the case or the guide arm 23. A central coil portion 30 of the twisting coil spring 24 is preferably supported on the shaft portion 28 in an engaging fashion.

The twisting coil spring 24 is mounted on a proximal end side half portion of the rod portion 25 of the guide arm 23, and one leg portion 31 of the twisting coil spring 24 is brought into elastic contact with an inner wall surface of a spring accommodating portion 33 of the rod portion 25 of the guide arm 31, whereas the other leg portion 32 is brought into elastic contact with an inner surface of a side wall 35 of a case main body 34. The spring accommodating portion 33 is formed into a slit or rectangular opening by notching the rod portion 25 of the guide arm 24 in that way. The twisting coil spring 24 has a spring force which acts in a direction in which the pair of leg portions 31, 32 are opened.

The vertical straight portion 11 of the wiring harness 3 is disposed in the vicinity of the proximal end portion (the shaft portion 28) of the guide arm 23, and as in the embodiment shown in FIG. 1, the straight portion 11 is caused to exit upwards from an opening 9 in an upper cover (not shown). The wiring harness 3 bends from the straight portion 11 horizontally in a direction which intersects the straight portion 11 at right angles and extends along the rod portion 25 and the head portion 26 of the guide member 23 so as to be caused to exit to the outside from the other opening 36. A connector 37 is provided at a movable end of the wiring harness 3 for electric connection.

Similar to the embodiment shown in FIG. 1, the case 22 is made up of the rectangular box-shaped case main body 34 and a cover (not shown), and the case main body 34 has a thin wiring harness accommodating chamber in such a manner as to accommodate therein the wiring harness 3 and the guide arm 23 together. The opening 36 is provided in a side wall 35 of the case main body 34 through which the head portion 26 of the guide arm 23 is caused to protrude to the outside together with the wiring harness 3.

As shown in FIG. 4, the guide arm 23 rotates about the shaft portion 28 so as to be positioned along an inner surface of the side wall 35 of the case 22 in such a state that the wiring harness 3 is pulled out to the outside of the case 22 against the biasing by the twisting coil spring 24, and the head portion 26 of the guide member 23 is caused to exit from the opening 36 together with the wiring harness 3. The wiring harness 3 is positioned so as to extend from the straight portion 11 in the corner portion of the case 22 straight along the rod portion 25 of the guide member 23 in parallel with the side wall 35 of the case 22 and then to bend smoothly with a relatively large radius along the head portion 26 of the guide arm 23 to thereby be caused to exit from the opening 36 to the outside of the case. The head portion 26 functions as a bending control portion which controls the bending radius of the wiring harness 3 so as not to be reduced.

As shown in FIG. 5, when the pulling out effort on the wiring harness 3 is released, the guide arm 23 rotates towards the inside of the case by virtue of the biasing force of the twisting coil spring 24 and the wiring harness 3 is pulled into the case together with the guide arm 23, so as to absorb the excess length in the wiring harness 3. Then, the wiring harness 3 forms a semi-annular (incompletely annular) curved portion (a bent portion) 40 within the case. The vertical straight portion 11 of the wiring harness 3 twists circumferentially.

The rod portion 25 of the guide arm 23 is then positioned to extend along an adjacent wall portion 38 of the case 22 to the side wall 35 thereof which intersects the side wall 35 at right angles, and the wiring harness 3 is positioned to extend straight along an inner surface of the adjacent wall portion 38, curves into an arc-like shape along the outer circumferential surface 26a of the head portion 26 in the vicinity of another wall portion 39 of the case 22 so as to continue to extend or be laid out substantially one-fourth the full circumference of a circle towards the opening, and is finally caused to exit from the opening while being bent smoothly along the side wall 35.

In the event that a connector 37 is provided at the movable end of the wiring harness 3, the connector 37 is connected to, for example, a connected on a stationary element such a vehicle body, while the case 22 is installed on a movable element such as a sliding door or sliding rail, whereby the case 22 moves back and forth relatively as indicated by an arrow C in association with the movement of the movable element. The case 22 can be installed on the stationary element, while the connector 37 can be installed on the movable element. The connector 37 being deleted, the wiring harness 3 can be laid out direct to the stationary element side.

Note that in the embodiment shown in FIGS. 4 to 5, a leaf spring or a compression coil spring can be used as the spring member in place of the twisting coil spring 24. When used, a leaf spring or a compression coil spring is provided between the inner surface of the rod portion 25 of the guide arm 23 and the side wall 35 of the case 22 in such a manner as to be brought into elastic contact therewith. In addition, the shape of the case 22 can be formed into a fan-like shape to match the bent shape of the wiring harness 3 in place of the rectangular shape. Additionally, instead of causing the straight portion 11 of the wiring harness 3 to rise vertically to its full extent, the straight portion 11 can be bent moderately in a horizontal direction at an angle of 90° or less (with a large bending radius) on its way to the upper wall portion of the case so as to be caused to exit to the outside of the case from an opening (not shown) in the front wall 38. In addition, as viewed in FIG. 4, in order that the head portion 26 of the guide arm 23 does not protrude (is not exposed) from the opening 36 to the outside of the case, the case 22 can be extended (expanded in width) in the direction in which the head portion 26 projects. Additionally, the shape of the guide arm 23 is not limited to that described above in this embodiment, and hence, there may be provided a guide arm having a head portion formed into not the semi-circular but a circular shape or a guide arm having a portion which connects rectilinearly a protruding distal end of a head portion 26 with a rotatably supported side proximal end of a rod portion 25. These modifications can be applied to individual embodiments of the invention which will be described later on. In addition, the case 22 being deleted, a recessed portion or the like (the wiring harness accommodating portion) in a sliding door or sliding seat can be used as a substitute for the case 22.

According to the third embodiment of the invention, since the wiring harness 3 can be pulled into the case momentarily by the guide arm 23, so as to absorb the excess length quickly, a risk can be prevented in an ensured fashion where the excess length in the wiring harness is held or caught between the stationary element and the movable element. In addition, since the spring member 24 is brought into elastic contact with not the wiring harness 3 but the guide arm 23 and is prevented from being brought into direct contact with the wiring harness 3, there exists no concern about wear and damage to the wiring harness 3. Additionally, since the length of the spring member 24 can be suppressed to one half or less the length of the guide arm 23, the space where to dispose the spring member 24 should be small or narrow, and the costs for the spring member 24 can be reduced. In particular, since the spring member 24 is accommodated in the inner space of the guide arm 23, the space within the case can be saved. In addition, since the wiring harness 3 does not intersect itself inside the case, the wiring harness is prevented from rubbing against itself and hence the wear thereof is prevented.

Figure 6:
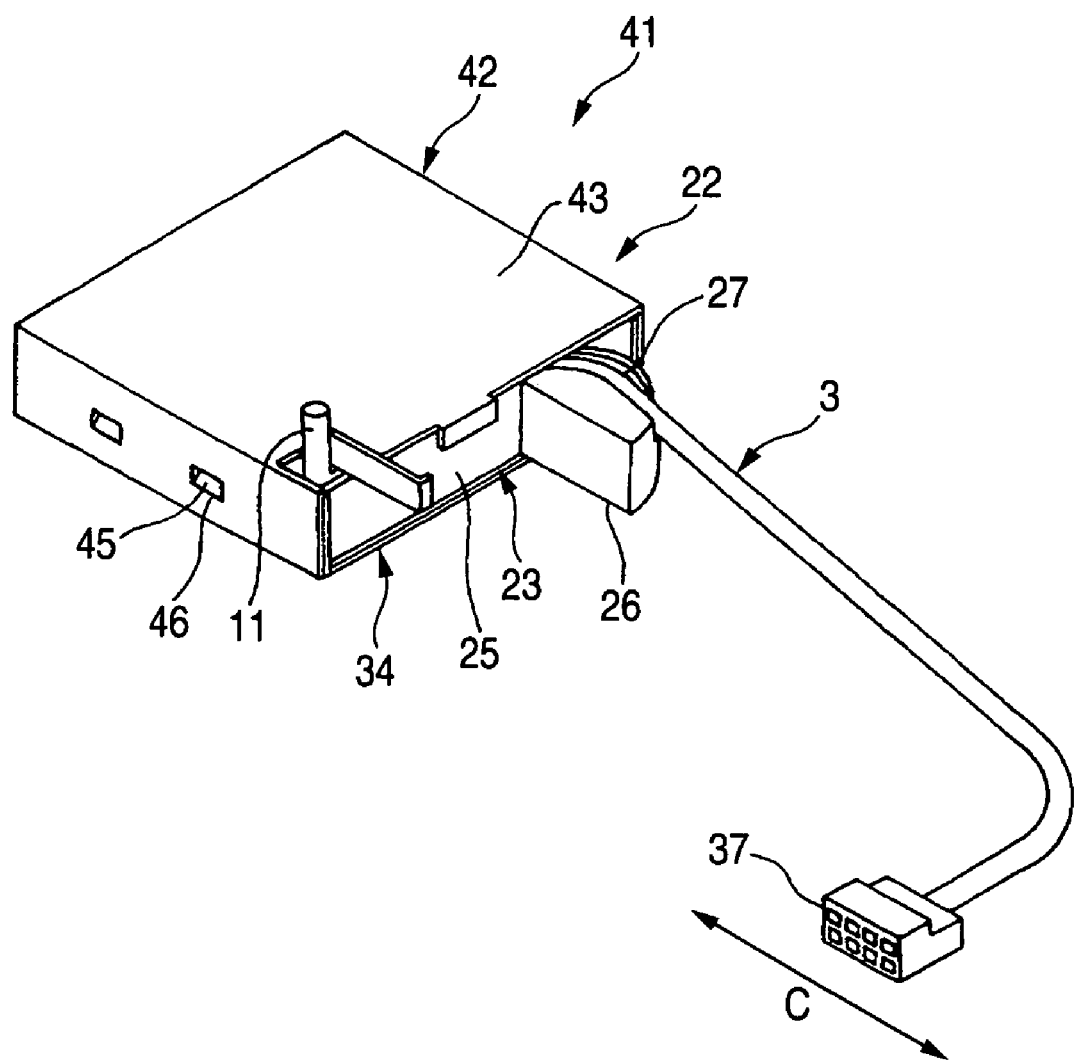
FIG. 6 is a perspective view showing a fourth embodiment of a wiring harness excess length absorbing device.
Figure 7:
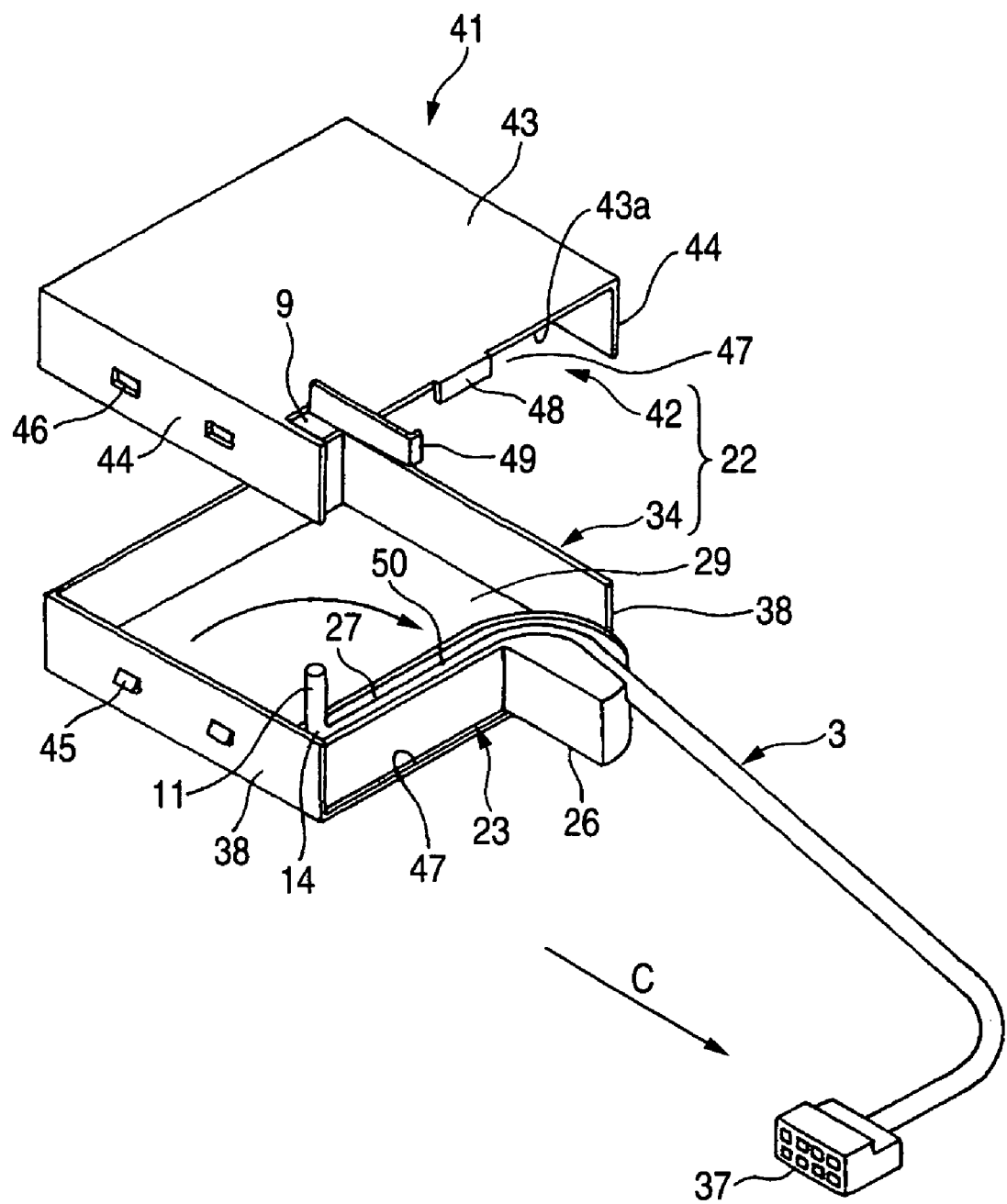
FIG. 7 is an exploded perspective view showing the same wiring harness excess length absorbing device.
Figure 8:
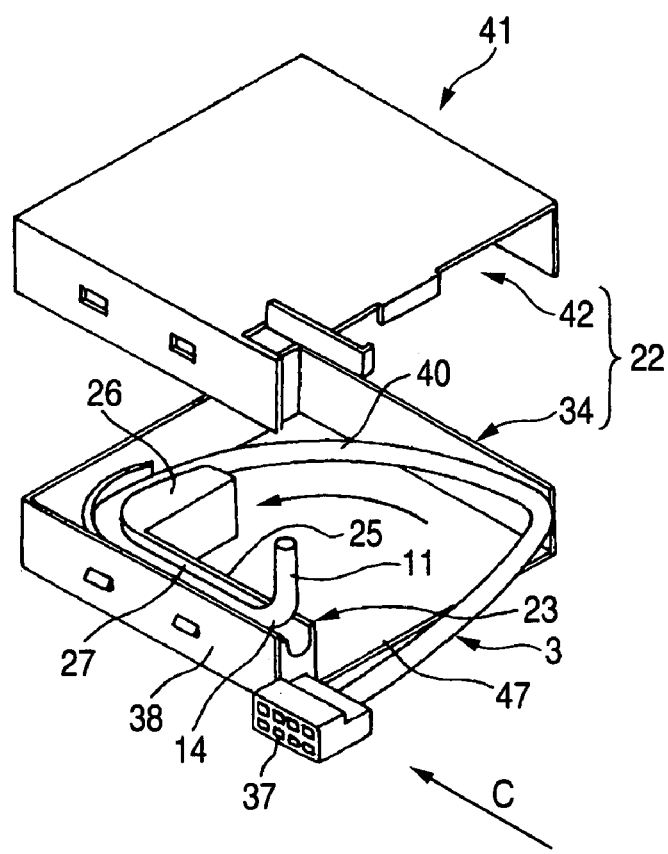
FIG. 8 is an exploded perspective view showing the same wiring harness excess length absorbing device resulting when an excess length is being absorbed.

FIGS. 6 to 8 are such as to show a fourth embodiment of a wiring harness excess length absorbing device (apparatus) according to the invention. This wiring harness excess length absorbing device (apparatus) 41 is such as to be similar to the wiring harness excess length absorbing device (apparatus) 21 of the previous embodiment (FIGS. 4 to 5), and hence, like reference numerals will be imparted to like functional constituent portions to those of the previous embodiment, and a detailed description thereof will be omitted.

As shown in FIG. 6, the wiring harness excess length absorbing device (apparatus) 41 includes a case 22 made from a synthetic resin and a guide are (the wiring harness guide member) made from a synthetic resin which is mounted rotatably within the case. The guide arm 23 is, as with the previous embodiment, a spring member 24 (FIG. 4) such as a twisting coil spring and is biased towards the inside of the case.

Figure 9:
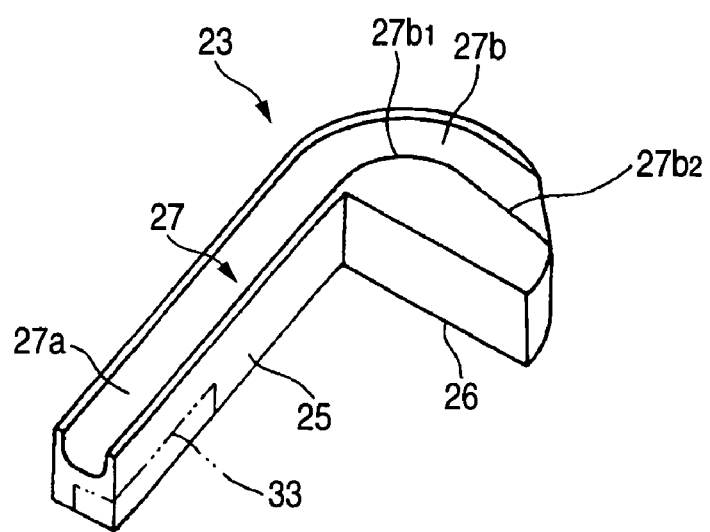
FIG. 9 is a perspective view showing a form of a guide arm which is used in the wiring harness excess length absorbing device.

The guide arm 23 of this embodiment has, as shown in FIG. 9, a wiring harness laying-out groove 27 not on side surfaces of a rod portion 25 and a head portion 26 but on an upper surface which intersects the side surfaces, that is, a surface which contacts a cover 42. A bottom surface of the wiring harness laying-out groove 27 is formed into an arc-like shape which follows a sectional shape of a wiring harness 3. The wiring harness laying-out groove 27 is made up of a straight groove portion 27*a* of the rod portion 25 and a substantially arc-shaped groove portion 27*b* of the head portion 26. The substantially arc-shaped groove portion 27*b* is made up of an arc-like portion 27*b*, which continues to the straight groove portion 27*a* in a tangential direction and a substantially straight portion 27*b*$_2$ which extends from the arc-shaped portion 27*b*$_1$ towards a projecting distal end of the head portion. The substantially arc-shaped groove portion 27*b* on the head portion 26 functions as a control portion which controls the bending radius of the wiring harness 3 in such a manner as to prevent the bending radius from being decreased any further than the radius of curvature thereof (a bending radius controlling portion). This bending radius controlling portion prevents the application of an excessive bending force to the wiring harness 3 so as to increase the bending durability of the wiring harness 3. A spring accommodating portion 33 which is formed into a slit or rectangular opening for accommodating therein the twisting coil spring or the like is provided by notching a proximal side half portion of the rod portion 25.

As shown in FIG. 7, the case (the wiring harness accommodating portion) 22 is made up of a rectangular box-shaped case main body 34 and a rectangular box-shaped cover 42 which us placed on the case main body 34 in such a manner as to cover it. The case main body 34 and the cover 42 have wall portions which intersect a horizontal bottom wall 29 or upper wall 43 at right angles and which are perpendicular to front and rear sides and another side, and the front and rear wall portions 38, 44 have locking projections 45 or engagement holes 46 which constitute a locking member. The form of the locking member is not limited to what is described above.

A remaining side portion of each of the case main body 34 and the cover 42 is opened in such a manner that one side of the guide arm 23 is exposed therefrom, and the head portion 26 of the guide arm 23 projects from this opening 47. A stopper wall 48 is provided on the cover 42 with which a side surface of the guide arm 23 is brought into abutment. As with the embodiment shown in FIG. 4, the guide arm 23 can be brought into abutment with the side wall 35 of the case main body 34 so as to be stopped thereby.

An opening 9 from which the wiring harness is allowed to exit and a wiring harness fixing plate (the fixing portion) are provided on the upper wall 43 of the cover 42. The fixing plate 49 may be caused to project horizontally as shown in FIG. 7 or may be caused to project upwards as in the embodiment shown in FIG. 1. The opening 9 is opened in one side of the cover 42, and a proximal end portion of the wiring harness laying-out groove 27 of the guide arm 23 is located direct below the opening 9, so that a straight portion 11 of the wiring harness 3 is caused to exit from the proximal end portion of the wiring harness guide groove 27 upwards into the opening 9. The straight portion 11 is formed in such a manner as to rise at right angles from a horizontal straight portion 50 of the wiring harness 3 in the wiring harness laying-out groove by way of a bent portion 14. The straight portion 11 is bent along the horizontal wiring harness fixing plate 49 into a crank-like shape at where it exit from the opening 9.

The guide arm 23 is rotatably supported at a shaft portion 28 (FIG. 4) on the bottom wall 29 of the case main body 34 at a proximal end portion thereof in such a manner as to be biased inwards by the twisting coil spring (FIG. 4), and one end of the twisting coil spring 24 is fixed to the bottom wall 29. When a leaf spring or a compression coil spring is used in place of the twisting coil spring 24 for the spring member, as in the embodiment shown in FIG. 4, a side wall 35 constituting an opening 36 is provided on the case main body 34.

The wiring harness laying-out groove 27 of the guide arm 23 is provided in such a manner as to face upwards, so that an upper opening of the wiring harness laying-out groove 27 is closed by an inner wall surface 43a of the upper wall 43 of the cover 42, whereby the wiring harness 3 is prevented from jumping out of the wiring harness laying-out groove 27. The wiring harness 3 does not have to be fixed in place within the wiring harness laying-out groove 27 with a band or the like but only a simple operation of passing the wiring harness 3 through the wiring harness laying-out groove 27 is required, thereby improving the assembling workability.

As shown in FIGS. 6, 7, when the wiring harness 3 is pulled out, the guide arm 23 rotates outwards against the biasing by the spring and is then brought into abutment with the stopper wall 48 of the cover 42 to be stopped threat. The wiring harness 3 rotates together with the guide arm 23 so as to be pulled out quickly. The straight portion 11 of the wiring harness 3 twists circumferentially to absorb the rotation of the guide arm 23. A connector 37 is provided at a movable end of the wiring harness 3, and the connector 37 relatively moves in a direction indicated by an arrow C in association with the movement of a movable element such as a sliding door, a sliding seat, a front side door and the like.

As shown in FIG. 8, when the pulling out effort on the wiring harness 3 is released, the guide arm 23 turns into the case so as to pull the wiring harness 3 into the case together with the guide arm 23 to thereby absorb the excess length in the wiring harness 3. The wiring harness 3 then forms a semi-annular (an incompletely annular) curved portion 40 within the case. The straight portion 11 of the wiring harness 3 twists in an opposite direction to the direction in which it twisted when the wiring harness 3 was pulled out so as to absorb the swing of the guide arm 23. In the event that the wiring harness stays longer in time in the pulled out state shown in FIG. 7 than in the pulled in state shown in FIG. 8, by restoring the straight portion 11 of the wiring harness 3 to its initial state (a state where no circumferential twist exists), the twist of the straight portion 11 can be suppressed to a minimum level.

The wiring harness 3 is positioned straight along the rod portion 25 of the guide arm 23 in an opposite direction to the direction in which it is pulled out, bends along the curved shape of the head portion 26 of the guide arm 23 with the large radius within the case, and bends again at an one end side of the laterally elongated opening 47 in the side of the case 22 to the front so as to be positioned towards the other end side of the opening 47. The connector 37 at the movable end side of the wiring harness 3 is positioned in the vicinity of the front wall portion 38 of the case 22 and moves in parallel from the state shown in FIG. 8 to the state shown in FIG. 7 in association with the movable element. The mounting of the connector 37 on to the stationary element and the installation of the case 22 on to the movable element are similar to those described in the embodiment shown in FIG. 4, and hence, the description thereof will be omitted here.

According to the fourth embodiment, since the wiring harness 3 rotates together with the guide arm 23 in such a state that the wiring harness 3 is held within the wiring harness laying-out groove 27 on the guide arm 23 without sliding contact with the bottom wall 29 of the case 22 and the upper wall 43 of the cover 42, the wear of the wiring harness 3 is prevented. In addition, since the wiring harness 3 does not have to be fixed to the guide arm 23, the assembling workability is improved. The wiring harness 3 is, needless to say, brought into contact with the arm biasing spring member 24. since the wiring harness 3 does not intersect itself within the case, the wiring harness 3 is prevented from rubbing against itself and hence the wear thereof is, of course, prevented. Also in the fourth embodiment, the case 22 being deleted, a recessed portion (the wiring harness accommodating portion) in a sliding door or a sliding seat can be used as a substitute therefor.

Figure 10:
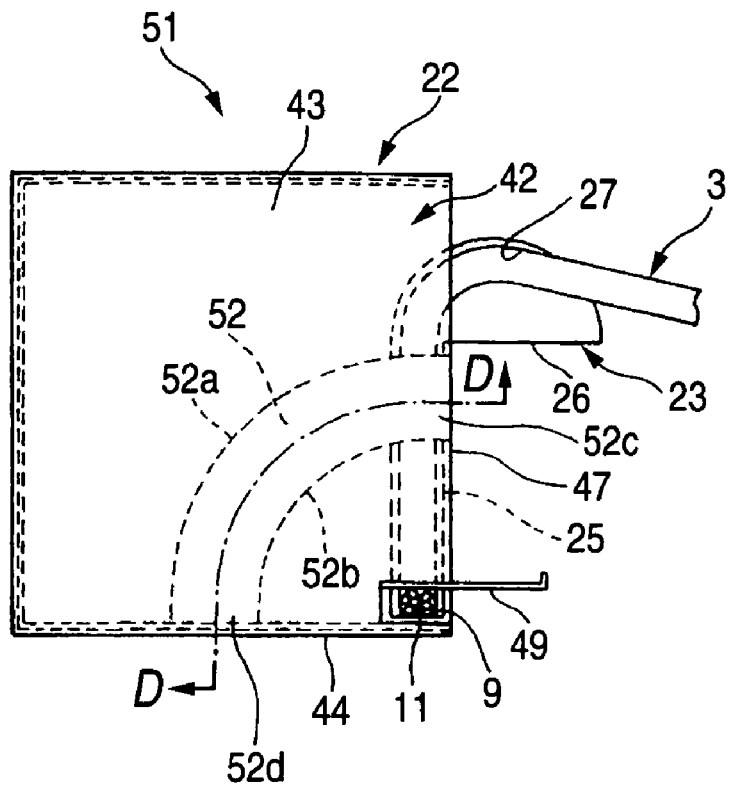
FIG. 10 is a plan view showing a fifth embodiment of a wiring harness excess length absorbing device.
Figure 11:
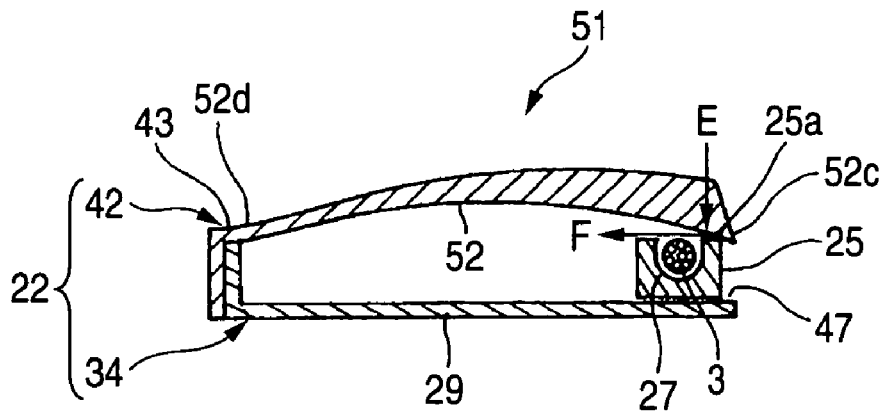
FIG. 11 is a sectional view taken along the line D-D in FIG. 20 which shows a main part of the same wiring harness excess absorbing mechanism.
Figure 12:
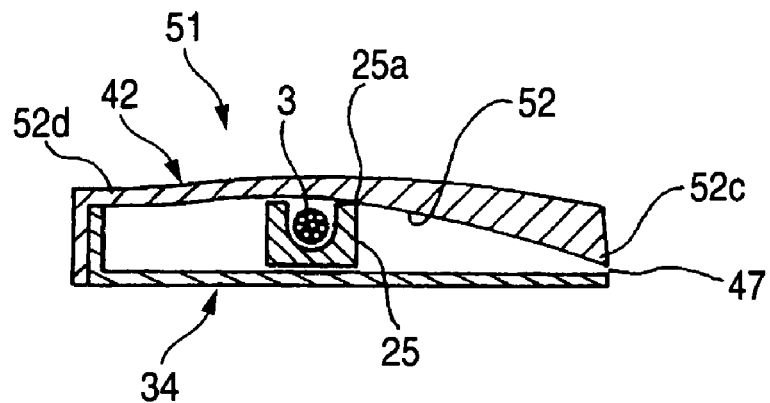
FIG. 12 is a sectional view showing a state an excess length is being absorbed in the same wiring harness excess length absorbing device.

FIGS. 10 to 12 are such as to show a fifth embodiment of a wiring harness excess length absorbing device (apparatus) according to the invention.

This wiring harness excess length absorbing device (apparatus) 51 is such that in the wiring harness excess length absorbing device (apparatus) 41 of the previous embodiment (FIG. 6), as shown in FIG. 10, an inclined portion (the spring member or the biasing member) 52 is provided into an arc-like shape on an inner surface of a cover 42 of a case (the wiring harness accommodating portion) 22 and as shown in FIG. 11, the inclined portion 52 is brought into elastic contact with an intersecting portion 25a at an upper outer end of a rod portion 25 of a guide arm (the wiring harness guide member) 23, so as to pull the guide arm 23 inwards as shown in FIG. 12 without using a spring member 24 (FIG. 4). Like reference numerals will be imparted to like portions to those of the embodiment shown in FIG. 6, and a detailed description thereof will be omitted here.

As shown in FIG. 10, the inclined portion 52 is formed into an arc-like belt shape which extends one-fourth the full circumference of a circle from an opening 47 at an end of a side of the rectangular cover 42 to a front wall 4 which lies at right angles to the side where the opening 47 is formed in such a manner as to be brought into press contact with a portion of a rod portion 25 of the guide arm 23 which lies closer to a head portion of the guide arm 23. A side edge of the arc-shaped inclined portion 52 is denoted by reference numeral 52a, the other side edge by reference numeral 52b, a distal end by reference numeral 52c and a proximal end by reference numeral 52d. As shown in FIG. 11 (which is a sectional view taken along the line D-D in FIG. 10), the thickness of the inclined portion 52 is set in such a manner as to gradually increase as it extends from the proximal end 52d to the distal end 52c, that is, from the front wall 44 of the cover 42 to the opening 47. The thickness of the inclined portion 52 at the thinnest proximal end portion 52d lying to the front wall of the cover is made to substantially equal the thickness of the upper wall 43 of the cover 42.

As with the embodiment shown in FIG. 7, the cover 42 is such as to be surrounded by vertical wall portions on three sides of the upper wall 43 except one side, and the inclined portion 52 is provided on the upper wall 43 of the cover 42. The three wall portions of the cover 42 are locked on to a box-shaped case main body 34 with a locking member, so that the upper wall 43 is rigidly fixed thereto and is made able to deflect to some extent by virtue of the laterally elongated opening 47 in one side of the case. By forming the inclined portion 52 on the upper wall 43 that is so configured, the inclined portion 52 is brought into elastic contact with the rod portion 25 of the guide arm 23 so as to function as the spring member 24 (FIG. 4) of the previous embodiment. The case 22 is made up of the case main body 34 and the cover 42.

In states shown in FIGS. 10, 11, a wiring harness 3 is pulled out to the outside of the case, the guide arm 23 is positioned in parallel with the opening 47 in the one side of the case 22 therealong, the head portion 26 of the guide arm 23 projects to the outside of the case from the opening 47 together with the wiring harness 3 and in this state, as shown in FIG. 11, a thickest portion of the inclined portion 52 on the upper wall 43 of the cover 42 is brought elastically and strongly into abutment with the edge portion 25a which intersects at right angles at the upper outer end of the rod portion 25 of the guide member 23 by virtue of biasing forces acting downward as indicated by an arrow E and in a longitudinal direction of the inclined portion as indicated by an arrow F (in a direction in which the guide arm rotates), whereby a force is applied to the guide arm 23 in a direction in which the guide arm 23 is pushed into the case.

When the pulling effort on the wiring harness 3 is released from the states shown in FIGS. 10, 11, as shown in FIG. 12, the guide arm 23 rotates about the shaft portion 28 lying at the proximal end side thereof as a fulcrum while being pushed into the case by means of the biasing force of the inclined portion 52 and moves to the case front wall 44 which intersects the opening 47 in FIG. 10 at right angles. The wiring harness 3 is pulled into the case together with the guide arm 23, so as to absorb the excess length in the wiring harness 3.

Note that in the event that the apparatus is installed in such a manner that the bottom wall 29 of the case 22 is not brought into contact with the mounting side such as the vehicle body or the door (in the event that the case 22 is placed vertically with, for example, the front wall 44 of the case 22 placed on the mounting side), the inclined portion 52, which functions as the biasing portion, can be provided not on the cover 22 but on the bottom wall 29 of the case main body 34. In addition, the inclined portion 52 can be provided on both the upper wall 43 of the cover 42 and the bottom wall 29 of the case main body 34 in such a manner as to face each other. It is needless to say that directions denoted by "front, rear, upper and lower" are so denoted only for the purpose of description. In addition, the cover 42 having the inclined portion 52 can be formed of a metallic material having elasticity or only the inclined portion 52 can be formed from a resin material having high elasticity so that the cover is formed as a two-color-part. Also in the fifth embodiment, the case 22 being deleted, a recessed portion or the like (the wiring harness accommodating portion) in, for example, a sliding door, a sliding seat or the like can be used as a substitute for the case 22, and in this case, a panel of the sliding door, the sliding seat or the like can be used as the cover 42.

According to the fifth embodiment of the invention, the separate metallic spring member 24 (FIG. 4) becomes unnecessary, and the number of components and the costs for components are reduced. In addition, since the guide arm 23 is pressed downwards by the inclined portion 52 of the cover 42 at all times, the loosening of the guide arm 23 is prevented. The effects that the wiring harness 3 does not intersect itself and does not contact the separate metallic spring member 24 are similar to those of the previous embodiment.

Figure 13:
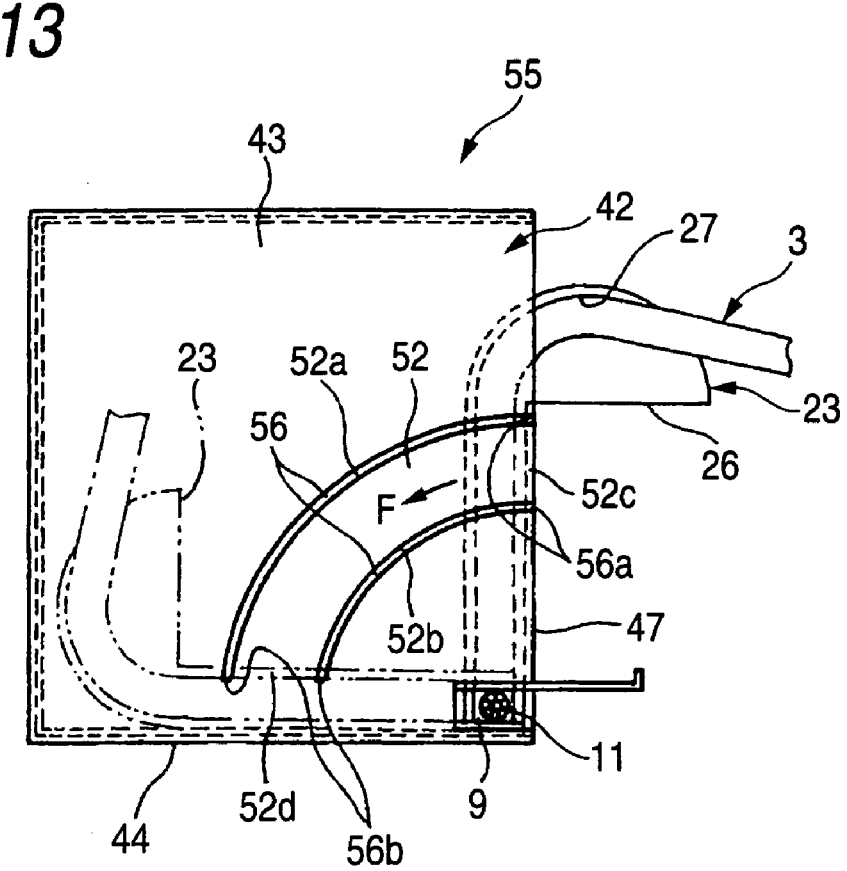
FIG. 13 is a plan view showing a sixth embodiment of a wiring harness excess length absorbing device.
Figure 14:
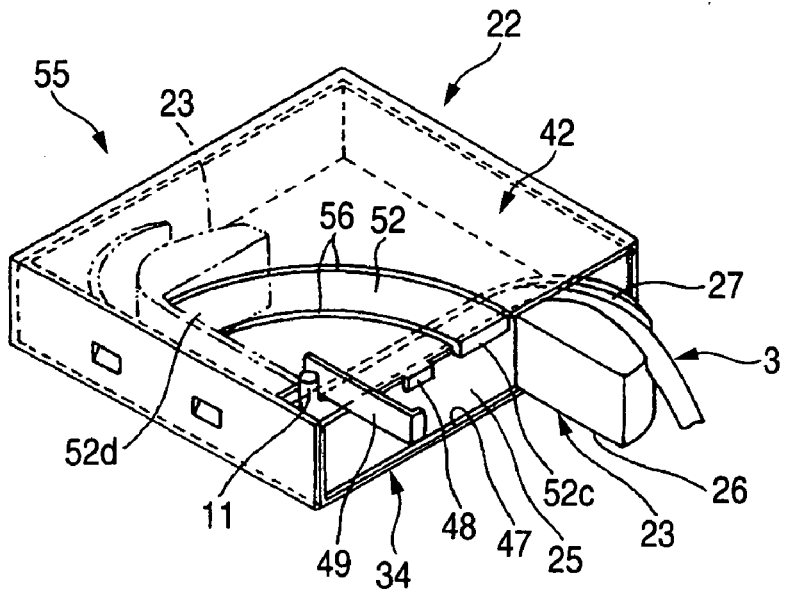
FIG. 14 is a perspective view showing the same wiring harness excess length absorbing device.

FIGS. 13 to 14 are such as to show a sixth embodiment of a wiring harness excess length absorbing device (apparatus) according to the invention.

This wiring harness excess length absorbing device (apparatus) 55 is such that the inclined portion (the spring member or the biasing member) 52 which is the biasing portion on the cover 42 of the wiring harness excess length absorbing device (apparatus) 51 shown in FIG. 10 is separated from an upper wall 43 of a cover 42 by a pair of front and rear or inner and outer slits 56. The other configurations remain the same as those of the embodiments shown in FIGS. 6 and 10. Like reference numerals will be imparted to like functional constituent portions to those of the embodiments, and a detailed description thereof will be omitted here.

An inclined portion 52 is positioned between a pair of slits 56. One side edge of the inclined portion 52 is denoted by reference numeral 52a and the other side edge by reference numeral 52b. One end 56a of each slit 56 communicates with an opening 47 formed in one side of a cover 42 of a case (the wiring harness accommodating portion) 22, and a thickest distal end portion of the inclined portion 52 constitutes a free end 52c, whereas the other end 56b of each slit 56 terminates slightly before a front wall 44 which intersects the opening 47 in the one side of the cover 42 at right angles, so that a guide arm (the wiring harness guide member) 23, which has rotated as indicated by chain lines, is situated between the terminal end 56b of the slit 56 and the front wall 44. The inclined portion 52 constitutes an arc-shaped leaf spring. The thickness of the inclined portion 52 is the same as that of the embodiment shown in FIG. 11, that is, the thickness thereof is thickest at the free end and gradually decreases as it extends from the free end 52c towards a fixed end 52d. The thickness of the fixed end 52d of the inclined portion 52 substantially equals the thickness of an upper wall 43 of the cover 42.

The guide arm 23 which is shown by solid lines in FIGS. 13, 14 are those resulting when a wiring harness 3 is pulled out, and as with the embodiment shown in FIG. 11, the guide arm 23 is elastically biased downwards and inwards (in a direction indicated by an arrow F) by the inclined portion 52 on the cover 42. Upon releasing the pulling out effort on the wiring harness 3 from this state, the guide arm 23 is pushed into the case by virtue of the biasing force of the inclined portion 52, whereby the wiring harness 3 is pulled into the case together with the guide arm 23.

As with the previous embodiment, the wiring harness 3 is introduced from an opening 9 in the upper wall 43 of the cover 42 of the case 22 so as to be laid out along the guide arm 23, is caused to exit to the outside from the wide opening 47 in the side of the cover 42 while bending with a large bending radius within the case while the bending radius thereof is being controlled to be constant by a head portion 26 of the guide arm 23 and eventually continues to a movable end of the wiring harness 3. When the guide arm 23 moves back and forth (rotates), a vertical straight portion 11 of the wiring harness 3 twists within the opening 9 so as to absorb the swing of the guide arm 23.

Note that the inclined portion 52 can be provided on a bottom wall of a case main body 34 or can be provided on both the cover 42 and the case main body 34 in such a manner as to face each other. In addition, the cover 42 and the inclined portion 52 can be formed of an elastic metallic material or only the inclined portion 52 can be formed of an elastic metallic plate. Additionally, the terminal end 56b of the slit 56 can be extended to a front wall 44 of the cover 42, so that, as with the embodiment shown in FIG. 10, the inclined portion 52 (the portion where an inclined surface exists) can be extended to the front wall 44. On the contrary, in the embodiment shown in FIG. 10, the inclined portion 52 can be terminated slightly before the front wall 44. In addition, the slits 56 are made to terminate slight before the opening 47 in the one side of the cover and slightly before the front wall 44, so that the inclined portion 52 can be supported not at one end but at both ends. Additionally, the case 22 being deleted, a recessed portion or the like (the wiring harness accommodating portion) in a sliding door, a sliding seat or the like can be used as a substitute for the case 22, and as this occurs, a panel of the sliding door, sliding seat or the like can be used as the cover 42.

According to the sixth embodiment of the invention, since the inclined portion 52 on the cover 42 is separated from the cover 42 by means of the slits 56, the flexibility of the inclined portion 52 is increased, so that the inclined portion 52 can press against the guide arm 23 more directly with strong elastic force, and therefore, the pushing operation of the guide arm 23 or the absorption of excess length can be effected in a more ensured fashion. The other advantages are similar to those of the individual embodiments that have already been described before.

Figure 15:
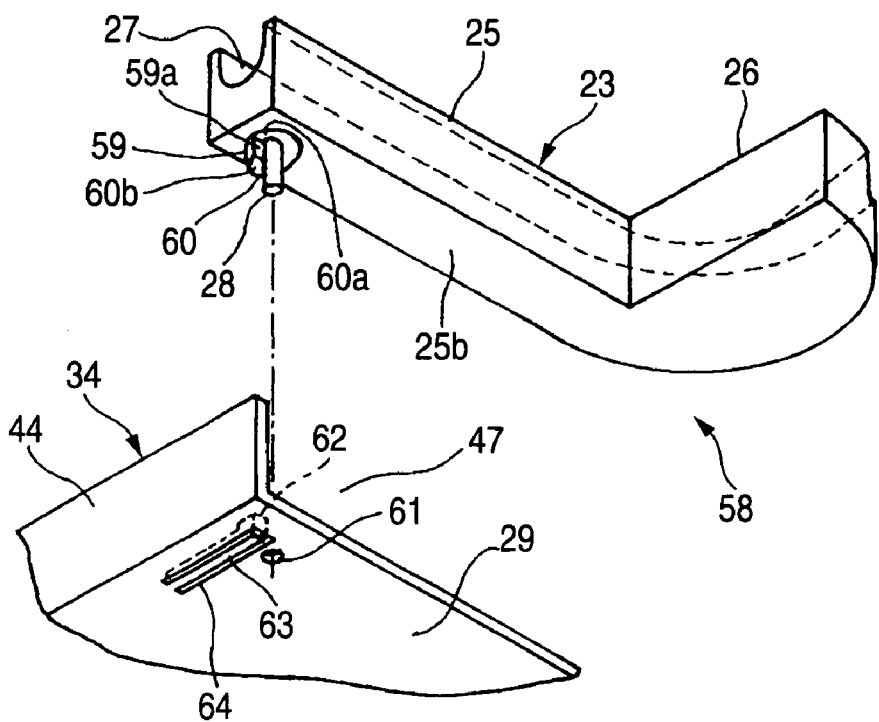
FIG. 15 is an exploded perspective view showing a main part of a seventh embodiment of a wiring harness excess length absorbing device.

FIG. 15 is such as to shown a seventh embodiment of a wiring harness excess length absorbing device (apparatus) according to the invention.

This wiring harness excess length absorbing device (apparatus) 58 is such that in the wiring harness excess length absorbing devices (apparatuses) 41, 51, 55 shown in FIGS. 6, 10, 13, a vertical shaft portion 28 is provided at a proximal end portion of a guide arm (the wiring harness guide member) 23, a wall portion (a boss portion) 59 having a spiral inclined surface 59a (the biasing member) is provided around the circumference the shaft portion 28, and a leaf spring (the spring member or the biasing member) 63 having a hole portion 61 with which the shaft portion 28 is brought into rotatable engagement and a projecting portion (the biasing member) 62 which presses against a spiral inclined surface 60 in the vicinity of the hole portion 61 is provided on a bottom wall 29 of a case main body 34. The metallic spring member 24 in the embodiment shown in FIG. 4 is not provided herein. The other configurations are the same as those of the embodiments shown in FIGS. 6, 10 and 13, and a detailed description thereof will be omitted here.

The shaft portion 28 is such as to be formed into a short circular cylindrical shape, and the spiral wall portion 59, which is made from resin, is formed integrally around an outer circumferential surface of the shaft portion 28, the shaft portion 28 projecting downwards longer than the spiral wall portion 59. The spiral wall portion 59 increases its thickness gradually and spirally from a lower end portion 60a which continues to a bottom surface 25b of the guide arm 23 substantially on the same plane and extends over a full circumference around the circumferential surface of the shaft portion 28, having a higher end portion (a top portion) 60b which is adjacent to the lower end portion 60a via a difference in level or elevated portion 59a. While a wiring harness laying-out groove 27 is provided on the guide arm 23, the wiring harness laying-out groove 27 may be such as the wiring harness laying-out groove 27 in the embodiment shown in FIG. 4 or no wiring harness laying-out groove 27 can be formed.

A leaf spring 63 is provided on the bottom wall 29 of the case main body 34 in such a manner as to be separated from the bottom wall 29 by slits 64 so as to be situated on the same plane as the bottom wall 29 in a free state. A short circular cylindrical projecting portion 62, which is made from resin, is formed integrally on a distal end of the leaf spring 63, and the projecting portion 62 is formed with a size which is equal to or smaller than the width of the spiral inclined surface 60, that is, with an outside diameter which is on the order of one-half the outside diameter of the spiral wall portion 59. In the state shown in FIG. 15 where the guide arm 23 is pulled out, the projecting portion 62 is provided at a position where it is brought into abutment with the top portion 60b of the spiral inclined surface 60. A distal end face of the projecting portion 62 is preferably formed into, for example, a semi-spherical surface, an inclined surface having a shape matching the spiral inclined surface 60, a face having an edge which is brought into line contact with the inclined surface 60 along a transverse direction thereof and the like.

In FIG. 15, when the shaft portion 28 of the guide arm 23 is brought into engagement with the hole portion 61 in the case main body, at the same time as this happens, the projecting portion 62 of the leaf spring 63 is brought into elastic abutment with the top portion 60b of the spiral inclined surface 60, and the leaf spring 63 deflects downwards and projects to the outside of the case main body 34. An upper surface of the guide arm 23 than comes to contact with an inner surface of the upper wall 43 of the cover 42 (FIG. 7) slidably with low friction. When the pulling effort on the guide arm 23 exerted by the wiring harness 3 is released, the projecting portion 62 comes to press against the top portion 60b of the spiral inclined surface 60 strongly by virtue of the force of the leaf spring 63, whereby a rotational force acts on the guide arm 23 in a direction in which the guide arm 23 is forced into the case, and the guide arm 23 rotates into the case about the shaft portion 28, so that the wiring harness 3 is pulled into the case together with the guide arm 23, so as to absorb the excess length in the wiring harness 3.

A distal end of the projecting portion 62 abuts the spiral inclined surface 60 elastically strongly, and a force is then exerted on the projecting portion 62 which moves from the top portion 60b to the lower end portion 60a of the spiral inclined surface 60, whereby the spiral wall portion 59 rotates in a direction in which the guide arm 23 is pulled into the case as viewed in FIG. 15. This results from the same principle as the biasing by the spring used by the inclined portion 52 shown in FIGS. 11 to 12.

Note that a separate metallic leaf spring or a compression coil spring may be used in place of the leaf spring 63 which is integrated with the case main body 34. The projecting portion 62 is provided at a distal end of these spring members. In addition, the hole portion 61 and the leaf spring 63 can be provided on the upper wall 43 of the cover 42 (FIG. 7) in place of those being provided on the bottom wall 29 of the case main body 34.

In addition, the shaft portion 28 can be provided on the bottom wall 29 of the case main body 34 or the upper wall 43 of the cover 42 (FIG. 7) separately from the spiral wall portion 59, and as this occurs, the hole portion 61 is provided in the guide arm 23. Additionally, while the center of the shaft portion 28 is preferably aligned with the center of the spiral wall portion 59, the centers of both the members are not aligned with each other but can be slightly offset from each other.

Additionally, the biasing by the spring member 63 can be used to assist the spring member 24 of the embodiment shown in FIG. 4. The biasing by the spring member 63 can be used as an assist to the spring biasing by the inclined portions 52 in FIGS. 11 and 13. In addition, the case 22 being deleted, a recessed portion or the like (the wiring harness accommodating portion) in, for example, a sliding door, a sliding seat or the like can be used as a substitute for the case 22, and in this case, a panel of the sliding door, the sliding seat or the like can be used as the case main body 34.

According to the seventh aspect of the invention, not only the spring biasing of the guide arm 23 can be effected while saving the space but also the necessity of a separate spring member can be obviated, and hence, the number of components and the costs for components can be reduced. The other advantages remain the same as those of the previous embodiments.

FIGS. 16 to 19 are such as to show an eighth aspect of a wiring harness excess length absorbing device (apparatus) according to the invention.

This wiring harness excess length absorbing device (apparatus) 80 is such that an interior panel 82 of an automotive sliding seat 81 (FIG. 19) is used as a substitute for the case, and a wiring harness 3 is expanded and contracted (extended and contracted) as far as an interior space of the interior panel 82 so as to absorb a sliding stroke of the seat 81.

Figure 16:
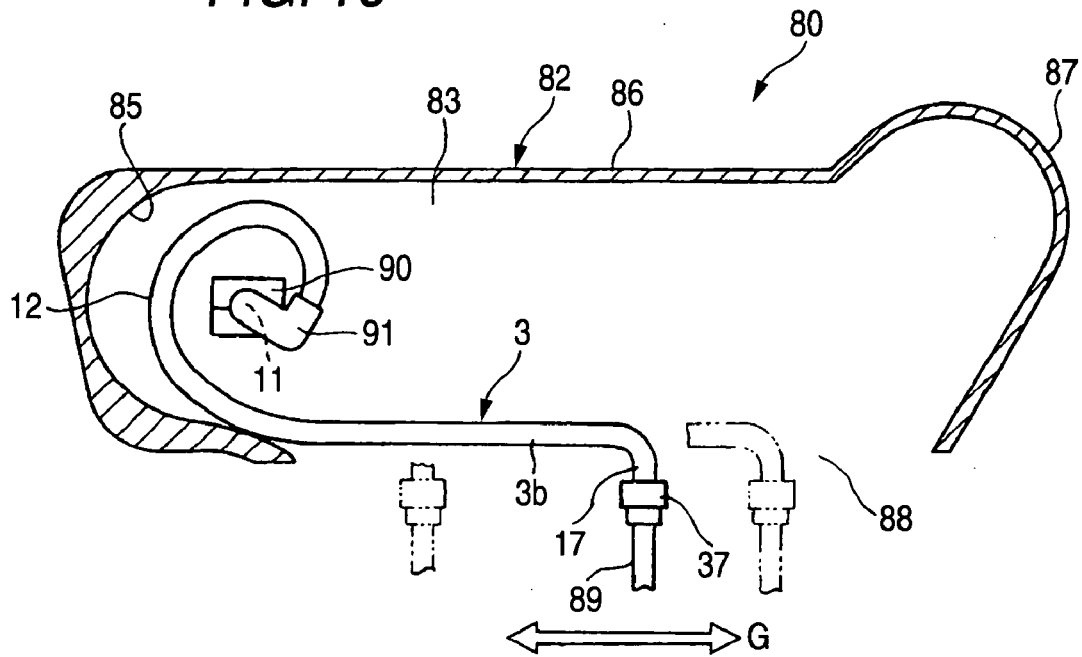
FIG. 16 is a longitudinal sectional view showing an eighth embodiment of a wiring harness excess length absorbing device.

The interior panel 82 is also referred to as a seat outer shield and is disposed perpendicularly (placed vertically) along one side surface of a seat cushion 84 of the seat 81. As shown in FIG. 16, the interior panel 82 has a long space in a back and forth or longitudinal direction thereof, and an inner wall surface 85 lying at a front end side of the space is formed into a moderately curved surface which matches a substantially semi-annular curved portion (bent portion) 12 of a wiring harness 3, so that the curved portion 12 is allowed to smoothly contact the inner wall surface 85 when it expands to its maximum diameter. The front end side curved surface 85 smoothly continues to an inner surface of a horizontal long upper wall 86 in an tangential direction, while a rear end side of the interior panel 82 is formed into a curved portion 87 which covers an intersecting portion between the seat cushion 84 and a seat back of the seat 81 (FIG. 19).

A lower end of the interior panel 82 continues to the front end side curved surface 85 and opens into a slit-like shape which extends long in the longitudinal direction, and a movable end 17 of a substantially horizontal movable side wiring harness portion 3b of the wiring harness 3 bends downwards (in a 90° direction) from this rectangular opening 88 and is then caused to exit therefrom in such a manner as to move back and forth in the longitudinal direction as indicated by chain lines and an arrow G for connection to floor side wiring harness 89 via a connector.

Figure 17:
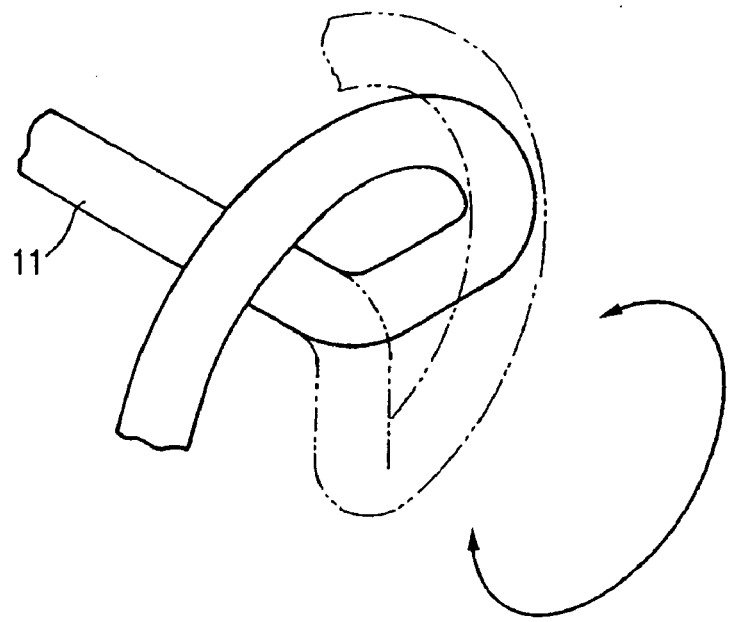
FIG. 17 is a perspective view showing a main part of the same wiring harness excess length absorbing device which illustrates the motion of a wiring harness thereof.

A stationary side wiring harness portion 3a (FIG. 18) which continues to the curved portion 12 of the wiring harness 3 at a bending center of the front end side curved surface 85 of the interior panel 82 or in the vicinity thereof is introduced into the interior of the cushion 84 of the seat 81 by way of a fixing portion 90 as a horizontal straight portion 11 (FIG. 17). In this embodiment, the curved portion 12 of the wiring harness 3 bends counterclockwise in a vertical direction from the horizontal straight portion 11 to continue to a substantially horizontal movable side wiring harness portion 3b, and the movable side wiring harness portion 3b is laid out to the rear substantially in parallel with a floor surface to continue to a connector connecting portion 37 with a floor side wiring harness 89.

In association with the sliding movement of the seat 81, the horizontal straight portion 11 twists (rotates torsionally), as shown in FIG. 17, while the curved portion 12 of the wiring harness 3 expands and contacts diametrically in a vertical direction, whereby the expanding and contracting motion of the curved portion 12 is absorbed. The straight portion 11 is fixed to the seat 81 by means of the fixing portion 90 (FIG. 16). A long extending and contracting stroke can be obtained within a limited space in the compact interior panel 82 through the combination of the curving operation and twisting operation of the wiring harness 3.

Figure 18A:
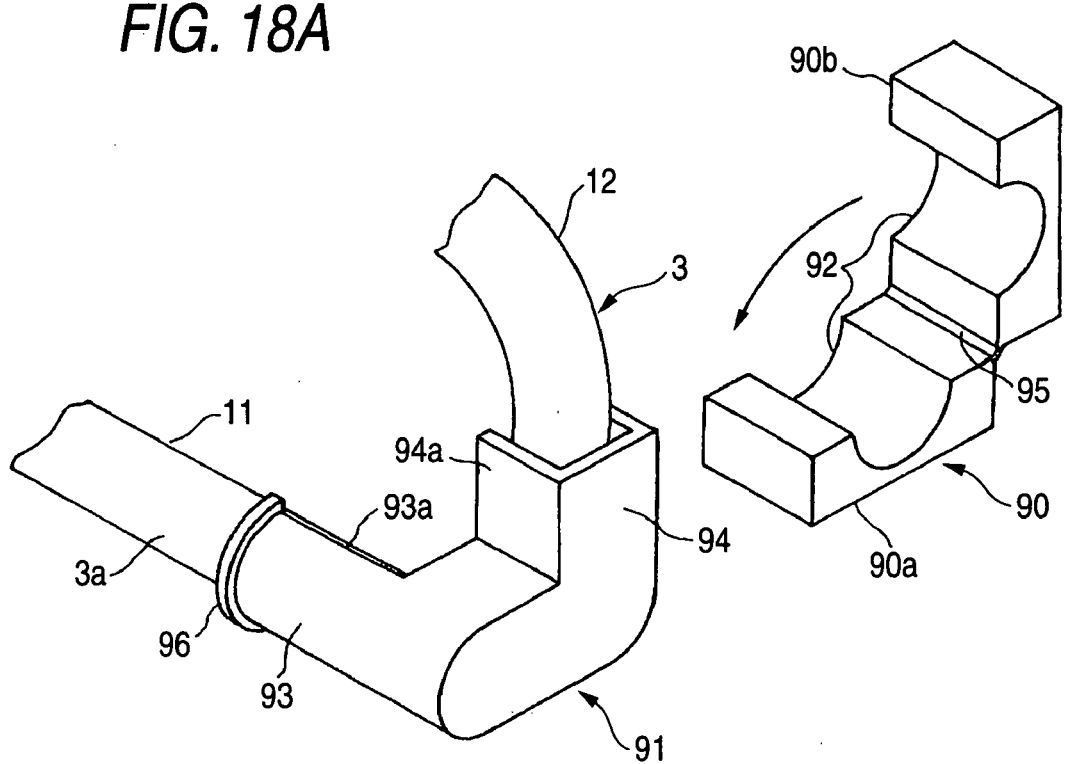
FIG. 18A is an exploded perspective view showing a rotary clamp which supports the wiring harness.
Figure 18B:
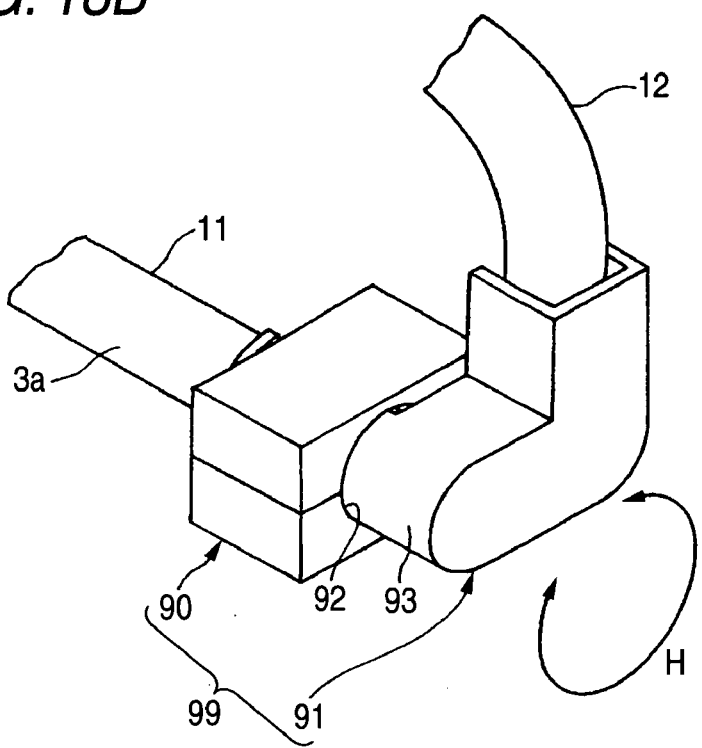
FIG. 18B is a perspective view showing an assembled state of the same clamp.
Figure 20:
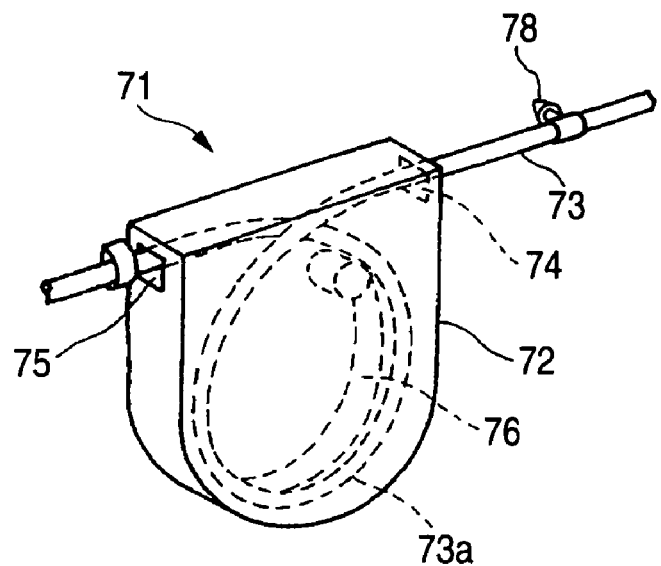
FIG. 20 is a perspective view showing an embodiment of a conventional wiring harness excess length absorbing device resulting when an excess length is being absorbed.
Figure 21:
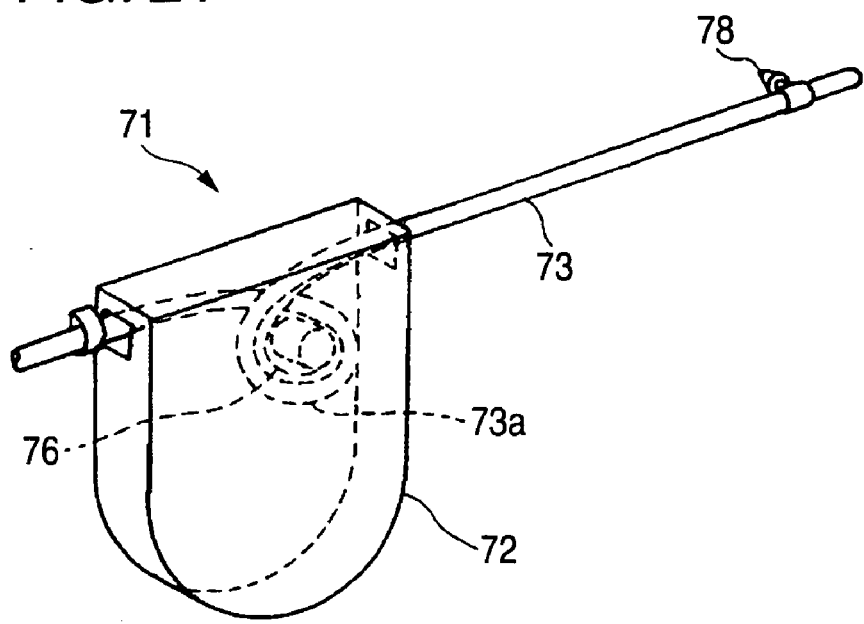
FIG. 21 is a perspective view showing the conventional wiring harness excess length absorbing device resulting when a wiring harness is pulled out.
Figure 22A:
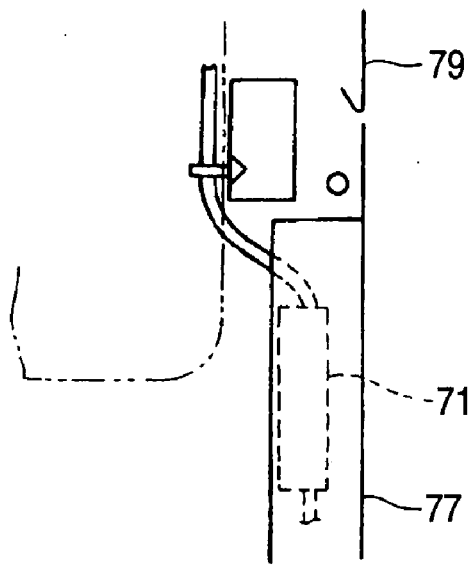
Figure 22B:
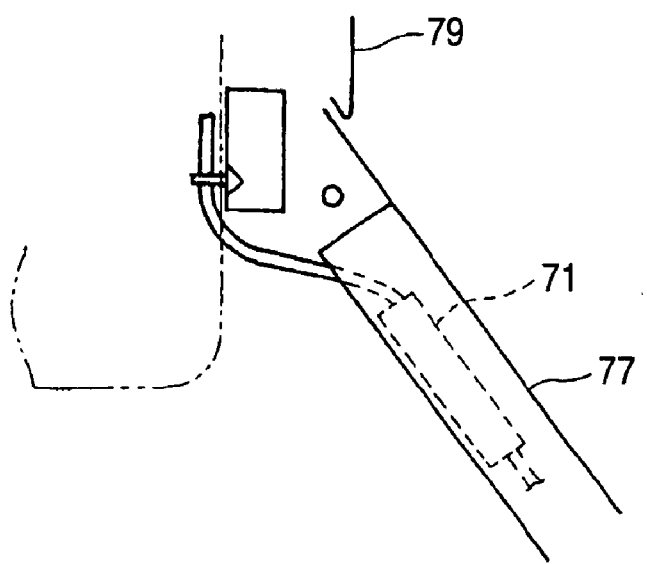

As shown in FIGS. 18A, 18B, the seat side fixing portion 90 is made up of a dividable outer clamp (bearing), and a horizontal and hollow shaft portion 93 of an inner clamp 91, which is formed into substantially an L shape as viewed externally, is passed through a horizontal hole portion 92 of an outer clamp 90 in such a manner as to rotate circumferentially, the straight portion 11 of the wiring harness 3 is passed through the shaft portion 93 of the inner clamp 91, and an initial end (proximal end) side portion of the curved portion 12 of the wiring harness 3 which continues to the straight portion 11 at right angles is passed and supported in a hollow guide portion 94 of the inner clamp 91 which intersects the shaft portion 93 at right angles. A rotary clamp 99 is made up of the outer and inner clamps 90, 91.

Both the clamps 90, 91 are preferably formed from synthetic resin. A pair of upper and lower dividable clamps 90a, 90b of the outer clamp 90 are connected together by a thin outer hinge 95 in such a manner as to open and close freely and each have a groove portion having a semi-circular cross section, the groove portions forming a circular hole 92 when joined together. The inner clamp 91 has a shaft portion having a semi-annular cross section and a gutter-like guide portion 94 which continues to the shaft portion 93 at right angles, and a flange or collar 96 is provided at a distal end of the shaft portion 93, whereby the shaft portion 93 is held on the outer clamp 90 between the collar 96 and an open end 94a of the guide portion 94 in such a manner as to rotate circumferentially as indicated by an arrow H. Similar to the shaft portion 93, the guide portion 94 has an opening 93a into which the wiring harness is placed.

The outer clamp 90 is fixed to a side of the cushion 84 of the seat 81, whereby the inner clamp 91 rotates in a perpendicular direction together with the curved portion 12 of the wiring harness 3 about the shaft portion 93 in association with the sliding movement of the seat 81, while the straight portion 11 of the wiring harness 3 is twisted (rotated torsionally) circumferentially together the shaft portion 93.

As shown in FIG. 19A, in a sliding front-most end position where the seat 81 is made to travel to a front-most position, the outer clamp 90 is fixed to the side of the cushion 84 of the seat 81 by means of a bolt or a locking clip, the curved portion 12 of the wiring harness 3 which is being curved into a semi-circular curved portion with a minimum diameter is caused to exit downwards from the inner clamp 91, the movable side wiring harness 3b continues horizontally from the inner clamp 91, a terminal side of the movable side wiring harness 3b bends downwards substantially at right angles to continue to the connector 37, and the movable side wiring harness 3b is connected to a floor side wiring harness 89 at the connector 37.

Following this, as shown in FIG. 19B, the outer shield (the wiring harness accommodating portion), which is the interior panel, is mounted externally on the wiring harness 89. As shown in FIG. 16, the outer shield 82 is covered by circumferential walls (reference numeral 86 is to used here to substitute reference numerals to be imparted individually) on upper side and both front and rear sides, is covered on one side by a perpendicular wall portion 97, and is opened into a rectangular shape on a lower face, whereby a terminal end and a connector 37 portion of the movable side wiring harness 3b are caused to exit from a lower opening 98 so formed.

As shown in FIG. 19C, when the seat 81 is caused to slide rearwards as indicated by an arrow J, the curved portion 12 of the wiring harness 3 expands diametrically inside a front side portion of the outer shield 82 while the horizontal short straight portion 11, which continues to the curved portion 12 at right angles, twists (rotates torsionally) circumferentially (clockwise as viewed in the figure), whereby the excess length in the wiring harness is absorbed in an ensured fashion.

When the seat 81 is caused to travel forwards from a seat withdrawal position shown in FIG. 19C, the curved portion 12 of the wiring harness 3 contracts diametrically within the outer shield 82, while the straight portion 11 twists circumferentially (counterclockwise as viewed in the figure) as shown in FIG. 19B, whereby the movable side wiring harness 3 is caused to extend horizontally.

According to the eighth embodiment of the invention, the excess length that is produced in association with the sliding operation of the seat 81 can be absorbed within the limited space smoothly and in an ensured fashion. In addition, by supporting the intersecting portion between the curved portion 12 and the straight portion 11 of the wiring harness 3 (a portion which includes the distal end side portion of the curved portion 12 and the distal end side portion of the straight portion 11) by the rotary clamp 99, the expanding and contracting operation of the curved portion 12 and the twisting operation of the straight portion 11 which take place in association with the sliding operation of the seat 81 can be performed smoothly and in an ensured fashion.

Note that the wiring harness 3 can be laid out by making use of an inner space of the seat 81 without using the outer shield 82. In this case, in contrast to what is shown in FIG. 19A, the outer clamp 90 is fixed to an inner surface of the cushion 84 of the seat 81.

In addition, as the rotary clamp 99, for example, the outer clamp 90 may be deleted, whereas the inner clamp 91 may be divided into two parts, whereby the wiring harness 3 is retained by being held therebetween, and the hollow annular shaft portion (93) of the inner clamp (91) can be supported rotatably direct on a mounting side portion such as a side of the seat 81. In short, anything that can hold the intersecting portion between the curved portion 12 and the straight portion 11 of the wiring harness 3 can function as the rotary clamp 90.

In addition, the spring member 16 shown in FIG. 2 can be applied to the embodiments shown in FIGS. 16 to 19, and the guide arms 23 and the biasing member 52 shown in FIGS. 4 to 15 can equally be applied the embodiments shown in FIGS. 16 to 19.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japan Patent Application No. 2005-185353 filed on Jun. 24, 2005 and Japan Patent Application No. 2006-9656 filed on Jan. 18, 2006, the contents of which are incorporated herein for reference.

What is claimed is:

1. A wiring harness excess length absorbing device, comprising:
   a supporting portion that rotatably supports a straight part of a wire harness; and
   a pullout portion through which a pass-through portion of the wire harness is passed,
   wherein the supporting portion and the pull out portion define a form of the wire harness in which an incompletely annular curved portion of the wire harness is formed, one end of the curved portion continues to the straight portion, the straight portion continues to a stationary side wiring harness portion, the other end of the curved portion continues to the pass-through portion which is continued to a movable side wiring harness portion, and an extending direction of the straight portion is perpendicular to an extending direction of the pass-through portion; and
   wherein when the movable side wiring harness portion is moved and the supporting portion is rotated, the straight portion twists in a circumferential direction thereof while a diameter of the curved portion is expanded or contracted.

2. The wiring harness excess length absorbing device as set forth in claim 1, further comprising a rotary clamp that supports the one end of the curved portion and the straight portion.

3. The wiring harness excess length absorbing device as set forth in claim 1, further comprising a biasing member tat biases the curved portion in a direction in which the diameter of the curved portion is expanded.

4. The wiring harness excess length absorbing device as set forth in claim 3, wherein the biasing member is an elastic member.

5. The wiring harness excess length absorbing device as set forth in claim 3, wherein the biasing member is a spiral spring.

6. A wiring harness excess length absorbing device, comprising:
   a guide member that is rotatably supported at a proximal end side of the guide member, and guides a wire harness which is arranged along the guide member, wherein the wire harness is defined such that one end of the wiring harness continues to a stationary side wiring harness portion at a proximal end side thereof, and the other end of the wiring harness continues to a movable side wiring harness portion by way of a distal end side of the guide member;
   a biasing member that biases the guide member so as to pull the movable side wiring harness portion; and
   a supporting portion that rotatably supports a straight part of the wire harness,
   wherein the wiring harness has an incompletely annular curved portion, and the one end of the curved portion continues to the straight portion, the straight portion continues to a stationary side wiring harness portion, and a plane defined by the curved portion is perpendicular to an extending direction of the straight portion is perpendicular to an extending direction of the other end of the wiring harness that continues to the movable side wiring harness portion.

7. The wiring harness excess length absorbing device as set forth in claim 6, wherein the guide member has a curved portion at the distal end side of the guide member.

8. The wiring harness excess length absorbing device as set forth in claim 6, wherein a groove for arranging the wire harness therein is formed in the guide member.

9. The wiring harness excess length absorbing device as set forth in claim 8, further comprising a wiring harness accommodating portion that contains the wire harness, wherein the groove is closed by an inner wall surface of the wiring harness accommodating portion.

10. The wiring harness excess length absorbing device as set forth in claim 6, wherein the biasing member is a twisting coil spring.

11. The wiring harness excess length absorbing device as set forth in claim 6, further comprising a wiring harness accommodating portion that contains the wire harness, wherein the biasing member has an inclined portion which is provided in the form of an arc-shaped belt on an inner wall surface of the wiring harness accommodating portion; and wherein the inclined portion has a thickness which is gradually reduced as it extends inwards from an outer side of the wiring harness accommodating portion.

12. The wiring harness excess length absorbing device as set forth in claim 11, wherein the inclined portion is separated from the inner wall surface by a slit.

13. The wiring harness excess length absorbing device as set forth in claim 6, further comprising a wiring harness accommodating portion that contains the wire harness, wherein the biasing member has;
 a spiral inclined surface which is provided at the proximal end side of the guide member; and
 a projecting portion which is provided in the wiring harness accommodating portion so as to be brought into elastically contact with the inclined surface.

14. A wiring harness excess length absorbing device, comprising:

a case having a top surface, a bottom surface and four side surfaces;

a first opening provided in the top surface, the first opening adjacent to one of the four side surfaces at a first corner portion of the case;

a second opening provided in the one side surface at a second corner portion of the case which is opposite to the first corner portion, such that the first opening is perpendicular to the second opening;

a guide member rotatably supported by a proximal end side thereof in the first corner portion of the case, the guide member having a straight rod portion extending from the proximal end side and a curved head portion extending from a side of the straight rod portion, a biasing member that biases the curved head portion toward and away from the second opening via the proximal end side of the guide member that is supported in the first corner of the case; and a wire harness supported along the guide member and having a first end that extends through the first opening and a second end that extends through the second opening, wherein an extending direction of the first end of the wire harness is perpendicular to an extending direction of the second end of the wire harness.

15. The wiring harness excess length absorbing device according to claim 14, wherein the curved head portion is operative to extend through the second opening during rotational movement of the guide member.

\* \* \* \* \*